(12) United States Patent
Cheng et al.

(10) Patent No.: US 8,619,633 B2
(45) Date of Patent: Dec. 31, 2013

(54) METHOD FOR TRANSMITTING AND RECEIVING UPLINK CONTROL INFORMATION, TERMINAL, BASE STATION

(75) Inventors: Yan Cheng, Beijing (CN); Yongxia Lv, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 57 days.

(21) Appl. No.: 13/365,718

(22) Filed: Feb. 3, 2012

(65) Prior Publication Data

US 2012/0134306 A1    May 31, 2012

Related U.S. Application Data

(63) Continuation of application No. PCT/CN2011/075504, filed on Jun. 9, 2011.

(30) Foreign Application Priority Data

Nov. 15, 2010   (CN) .......................... 2010 1 0556633

(51) Int. Cl.
*H04L 12/28* (2006.01)
*H04Q 7/00* (2006.01)

(52) U.S. Cl.
USPC .......................................... 370/255; 370/328

(58) Field of Classification Search
USPC .................. 370/254, 255, 328, 338
See application file for complete search history.

(56) References Cited

U.S. PATENT DOCUMENTS

| | | | |
|---|---|---|---|
| 2008/0298224 A1* | 12/2008 | Pi et al. ........................ | 370/204 |
| 2009/0073922 A1* | 3/2009 | Malladi et al. ................ | 370/328 |
| 2010/0272019 A1 | 10/2010 | Papasakellariou et al. | |
| 2011/0200003 A1* | 8/2011 | Pi et al. ........................ | 370/330 |
| 2011/0268080 A1* | 11/2011 | Luo et al. ..................... | 370/330 |
| 2012/0057551 A1* | 3/2012 | Kim et al. ..................... | 370/329 |
| 2012/0307760 A1* | 12/2012 | Han et al. ...................... | 370/329 |
| 2012/0320852 A1* | 12/2012 | Seo et al. ...................... | 370/329 |

FOREIGN PATENT DOCUMENTS

| | | |
|---|---|---|
| AI | 101409894 A | 4/2009 |
| CN | 101702631 A | 5/2010 |
| WO | 2009/107985 A1 | 9/2009 |

OTHER PUBLICATIONS

Supplementary European Search Report issued in corresponding European Patent Application No. 11 78 6154; mailed Jul. 10, 2012.

(Continued)

*Primary Examiner* — Hong Cho

(74) *Attorney, Agent, or Firm* — Brinks Gilson & Lione

(57) ABSTRACT

A method for transmitting and receiving Uplink Control Information (UCI), a terminal, and a base station are provided. The transmitting method includes: calculating the number (Q') of modulation symbols occupied by the UCI to be transmitted; dividing the information bit sequence of the UCI to be transmitted into two parts; using Reed Muller (RM) (32, 0) codes to encode each part of information bit sequence of the UCI to be transmitted to obtain a 32-bit coded bit sequence respectively, and performing rate matching so that the rate of the first 32-bit coded bit sequence is $\lceil Q'/2 \rceil \times Q_m$ bits and that the rate of the second 32-bit coded bit sequence is $(Q'-\lceil Q'/2 \rceil) \times Q_m$ bits; and mapping the two parts of coded bit sequences that have undergone rate matching onto a Public Uplink Shared Channel (PUSCH), and transmitting the coded bit sequences to a base station.

19 Claims, 10 Drawing Sheets

(56) References Cited

OTHER PUBLICATIONS

International Search Report issued in corresponding PCT Application No. PCT/CN2011/075504; mailed Sep. 29, 2011.
Huawei, HiSilicon "A/N Coding for Large Payload using DFT-S-OFDM" 3GPP TSG RAN WG1 meeting #62bis. Xi'An, China; Oct. 11-15, 2010.
CMCC, et al. "Way Forward on Supporting ACK/NAK Payload Larger than 11 Bits in Rel-10 TDD" TSG RSN WG1 meeting #62bis. Xi'An, China; Oct. 11-15, 2010.
LG Electronics "Channel Coding for UCI on PUSCH" 3GPP TSG RAN WG1 #63. Jacksonville, USA; Nov. 15-19, 2010.
Huawei, HiSilicon "Coding and Resource Mapping for UCI on PUSCH" 3GPP TSG RAN WG1 #63. Jacksonville, USA; Nov. 15-19, 2010.
"$3^{rd}$ Generation Partnership Project; Technical Specification Group Radio Access Network; Evolved Universal Terrestrial Radio Access (E-UTRA); Multiplexing and Channel Coding (Release 10)" 3GPP TS36.212. Sep. 2011.
Written Opinion of the International Searching Authority issued in corresponding PCT Patent Application No. PCT/CN2011/075504, mailed Sep. 29, 2011.
Office Action issued in corresponding European Patent Application No. 11786154.2, mailed May 6, 2013.

\* cited by examiner

METHOD FOR TRANSMITTING AND RECEIVING UPLINK CONTROL INFORMATION, TERMINAL, BASE STATION

CROSS-REFERENCE TO RELATED APPLICATIONS

This application is a continuation of International Application No. PCT/CN2011/075504, filed on Jun. 9, 2011, which claims priority to Chinese Patent Application No. CN201010556633.2, filed on Nov. 15, 2010, both of which are hereby incorporated by reference in its entireties.

FIELD OF THE APPLICATION

The present application relates to radio communication field, and in particular, to a method for transmitting and receiving Uplink Control Information (UCI), a terminal, and a base station.

BACKGROUND OF THE APPLICATION

A TDD (Time Division Duplexing, Time Division Duplexing) system sends and receives information on one frequency channel, but the receiving and the sending of the information use different time slots of one frequency carrier. The data transmission of the downlink subframe corresponds to UCI such as response information, which is generally fed back through an uplink subframe.

A LTE (Long Term Evolution, Long Term Evolution) TDD system includes 7 uplink-downlink subframe configurations. In some of uplink-downlink subframe configurations, the number of downlink subframes is greater than the number of uplink subframes, and it is possible that the UCI corresponding to data transmission of multiple downlink subframes need to be fed back on the same uplink subframe. The UCI is generally encoded through RM (Reed Muller, Reed Muller) (32, O) code before being transmitted to the base station.

An LTE-A (Long Term Evolution Advanced, Long Term Evolution Advanced) system is a further evolved and enhanced LTE system. In an LTE-A TDD system, carrier aggregation is introduced. When a terminal accesses multiple component carriers simultaneously, the terminal needs to feed back UCI on the same uplink carrier, where the UCI is UCI of multiple downlink subframes from multiple downlink component carriers. Therefore, the bits occupied by UCI on one uplink subframe increase significantly. When the number of bits occupied by UCI exceeds the maximum number of bits (11 bits) supported by RM (32, O) code, it is urgent to put forward a solution to transmitting UCI, which is lacking in the prior art.

SUMMARY OF THE APPLICATION

An embodiment provides a method for transmitting and receiving UCI, a terminal, and a base station to transmit UCI to resolve the problem that the number of occupied bits exceeds the maximum number of bits supported by RM (32, O) code. The technical solution is as follows:

A method for transmitting UCI includes:

calculating the number $Q'$ of modulation symbols occupied by UCI to be transmitted;

dividing an information bit sequence of the UCI to be transmitted into two parts;

using RM (32, O) code to encode each part of the information bit sequence of the UCI to be transmitted to obtain a 32-bit coded bit sequence respectively, and perform rate matching for each 32-bit coded bit sequence respectively to set a first 32-bit coded bit sequence to $\lceil Q'/2 \rceil \times Q_m$ bits coded bit sequence through rate matching and to set a second 32-bit coded bit sequence to $(Q' - \lceil Q'/2 \rceil) \times Q_m$ bits coded bit sequence through rate matching, where $Q_m$ is modulation order corresponding to the UCI to be transmitted, and $\lceil\ \rceil$ refers to rounding up; and mapping the two parts of coded bit sequences that have undergone rate matching onto a Physical Uplink Shared Channel PUSCH and transmitting the two parts of the coded bit sequences to a base station.

In one aspect, the mapping the two parts of coded bit sequences that have undergone rate matching onto the PUSCH and transmitting the two parts of the coded bit sequences to the base station includes: concatenating the two parts of coded bit sequences that have undergone rate matching to form a new bit sequence, mapping the new bit sequence onto the PUSCH, and transmitting the new bit sequence to the base station; or selecting alternately $4Q_m$ coded bits in one of the two parts of coded bit sequences that have undergone rate matching and $4Q_m$ coded bits in the other part of coded bit sequences that have undergone rate matching to form a new bit sequence, mapping the new bit sequence onto the PUSCH, and transmitting the new bit sequence to the base station; or selecting alternately $Q_m$ coded bits in one of the two parts of the coded bit sequences that have undergone rate matching and $Q_m$ coded bits in the other part of the coded bit sequences that have undergone rate matching; after $4Q_m$ coded bits are selected, switching order of selecting alternately the two parts of coded bit sequences that have undergone rate matching, going on selecting the coded bits alternately to form a new bit sequence, mapping the new bit sequence onto the PUSCH, and transmitting the new bit sequence to the base station.

In another aspect, the setting the first 32-bit coded bit sequence to $\lceil Q'/2 \rceil \times Q_m$ bits coded bit sequence through rate matching includes: if a value of $\lceil Q'/2 \rceil \times Q_m$ is less than or equal to 32, selecting first $\lceil Q'/2 \rceil \times Q_m$ bits in the first 32-bit coded bit sequence; if the value of $\lceil Q'/2 \rceil \times Q_m$ is greater than 32, according to $q_i = b_{(i \bmod 32)}$ ($i = 0, 1, \ldots, (\lceil Q'/2 \rceil \times Q_m - 1)$), performing rate matching to set the first 32-bit coded bit sequence to $\lceil Q'/2 \rceil \times Q_m$ bits coded bit sequence, wherein $q_i$ is a coded bit sequence output after the first 32-bit coded bit sequence is set to $\lceil Q'/2 \rceil \times Q_m$ bits coded bit sequence through rate matching, $$b_j = \sum_{n=0}^{O'-1} (O_n \times M_{j,n}) \bmod 2$$

($j = 0, 1, \ldots, 31$) is the first 32-bit coded bit sequence, $O_n$ is a bit in the information bit sequence corresponding to the first 32-bit coded bit sequence, $M_{j,n}$ is a basic sequence of RM (32, O) code, and $O'$ is the number of bits of the information bit sequence corresponding to the first 32-bit coded bit sequence.

In another aspect, the step of setting the second 32-bit coded bit sequence to $(Q' - \lceil Q'/2 \rceil) \times Q_m$ bits coded bit sequence through rate matching includes: if a value of $(Q' - \lceil Q'/2 \rceil) \times Q_m$ is less than or equal to 32, selecting first $(Q' - \lceil Q'/2 \rceil) \times Q_m$ bits in the second 32-bit coded bit sequence; if the value of $(Q' - \lceil Q'/2 \rceil) \times Q_m$ is greater than 32, according to $q_i = b_{(i \bmod 32)}$ ($i = 0, 1, \ldots, ((Q' - \lceil Q'/2 \rceil) \times Q_m - 1)$), performing rate matching to set the second 32-bit coded bit sequence to $(Q' - \lceil Q'/2 \rceil) \times Q_m$ bits coded bit sequence, wherein $q_i$ is a coded bit sequence output after the second 32-bit coded bit sequence is set to $(Q'-\lceil Q'/2 \rceil) \times Q_m$ bits coded bit sequence through rate matching, $$b_j = \sum_{n=0}^{O'-1} (O_n \times M_{j,n}) \mod 2 (j = 0, 1, \ldots, 31)$$

is the second 32-bit coded bit sequence, $O_n$ is a bit in the information bit sequence corresponding to the second 32-bit coded bit sequence, $M_{j,n}$ is a basic sequence of RM (32, O) code, and O' is the number of bits of the information bit sequence corresponding to the second 32-bit coded bit sequence.

In another aspect, the performing rate matching for each 32-bit coded bit sequence respectively is: performing rate matching for each 32-bit coded bit sequence respectively by circular repetition.

A method for receiving UCI includes:

receiving UCI sent by a terminal, and calculating the number Q' of modulation symbols occupied by the UCI;

determining candidate control information bit sequences according to the number of bits of the UCI;

dividing each candidate control information bit sequence into two parts;

using RM (32, O) code to encode each part of each candidate control information bit sequence to obtain a 32-bit coded bit sequence respectively, and performing rate matching for each 32-bit coded bit sequence to set a first 32-bit coded bit sequence to $\lceil Q'/2 \rceil \times Q_m$ bits coded bit sequence through rate matching and to set a second 32-bit coded bit sequence to $(Q'-\lceil Q'/2 \rceil) \times Q_m$ bits coded bit sequence through rate matching, where $Q_m$ is modulation order corresponding to the UCI, and $\lceil \ \rceil$ refers to rounding up; and detecting the UCI by using the two parts of coded bit sequences which correspond to each candidate control information bit sequence and have undergone rate matching.

In one aspect, the detecting the Uplink Control Information by using the two parts of coded bit sequences which correspond to each candidate control information bit sequence and have undergone rate matching includes: concatenating the two parts of coded bit sequences that have undergone rate matching to form a new bit sequence, and using the new bit sequence to detect the Uplink Control Information; or selecting alternately $4Q_m$ coded bits in one of the two parts of coded bit sequences that have undergone rate matching and $4Q_m$ coded bits in the other part of coded bit sequences that have undergone rate matching to form a new bit sequence, and using the new bit sequence to detect the UCI; or selecting alternately $Q_m$ coded bits in one of the two parts of the coded bit sequences that have undergone rate matching and $Q_m$ coded bits in the other part of coded bit sequences that have undergone rate matching; after $4Q_m$ coded bits are selected, switching order of selecting alternately the two parts of coded bit sequences that have undergone rate matching, going on selecting the coded bits alternately to form a new bit sequence, and using the new bit sequence to detect the Uplink Control Information.

In another aspect, the setting the first 32-bit coded bit sequence to $\lceil Q'/2 \rceil \times Q_m$ bits coded bit sequence through rate matching includes: if a value of $\lceil Q'/2 \rceil \times Q_m$ is less than or equal to 32, selecting first $\lceil Q'/2 \rceil \times Q_m$ bits in the first 32-bit coded bit sequence; and if the value of $\lceil Q'/2 \rceil \times Q_m$ is greater than 32, according to $q_i = b_{(i \mod 32)}$ ($i=0, 1, \ldots, (\lceil Q'/2 \rceil \times Q_m - 1)$), performing rate matching to set the first 32-bit coded bit sequence to $\lceil Q'/2 \rceil \times Q_m$ bits coded bit sequence, wherein $q_i$ is a coded bit sequence output after the first 32-bit coded bit sequence is set to $\lceil Q'/2 \rceil \times Q_m$ bits coded bit sequence through rate matching, $$b_j = \sum_{n=0}^{O'-1} (O_n \times M_{j,n}) \mod 2$$

$(j=0,1,\ldots,31)$ is the first 32-bit coded bit sequence, $O_n$ is a bit in the information bit sequence corresponding to the first 32-bit coded bit sequence, $M_{j,n}$ is a basic sequence of RM (32, O) code, and O' is the number of bits of the information bit sequence corresponding to the first 32-bit coded bit sequence.

In another aspect, the setting the second 32-bit coded bit sequence to $(Q'-\lceil Q'/2 \rceil) \times Q_m$ bits coded bit sequence through rate matching includes: if a value of $(Q'-\lceil Q'/2 \rceil) \times Q_m$ is less than or equal to 32, selecting first $(Q'-\lceil Q'/2 \rceil) \times Q_m$ bits in the second 32-bit coded bit sequence; and if the value of $(Q'-\lceil Q'/2 \rceil) \times Q_m$ is greater than 32, according to $q_i = b_{(i \mod 32)}$ ($i=0, 1, \ldots, ((Q'-\lceil Q'/2 \rceil) \times Q_m - 1)$), performing rate matching to set the second 32-bit coded bit sequence to $(Q'-\lceil Q'/2 \rceil) \times Q_m$ bits coded bit sequence, wherein $q_i$ is a coded bit sequence output after the second 32-bit coded bit sequence is set to $(Q'-\lceil Q'/2 \rceil) \times Q_m$ bits coded bit sequence through rate matching, $$b_j = \sum_{n=0}^{O'-1} (O_n \times M_{j,n}) \mod 2$$

$(j=0,1,\ldots,31)$ is the second 32-bit coded bit sequence, $O_n$ is a bit in the information bit sequence corresponding to the second 32-bit coded bit sequence, $M_{j,n}$ is a basic sequence of RM (32, O) code, and O' is the number of bits of the information bit sequence corresponding to the second 32-bit coded bit sequence.

A terminal includes:

a calculating module, configured to calculate the number Q' of modulation symbols occupied by UCI to be transmitted, and obtain modulation order $Q_m$ corresponding to the UCI to be transmitted;

a first dividing module, configured to divide an information bit sequence of the UCI to be transmitted in the calculating module into two parts;

a first encoding module, configured to use RM (32, O) code to encode each part of the information bit sequence of the UCI to be transmitted to obtain a 32-bit coded bit sequence respectively, and perform rate matching for each 32-bit coded bit sequence to set a first 32-bit coded bit sequence to $\lceil Q'/2 \rceil \times Q_m$ bits coded bit sequence through rate matching and to set a second 32-bit coded bit sequence to $(Q'-\lceil Q'/2 \rceil) \times Q_m$ bits coded bit sequence through rate matching, where $Q_m$ is the modulation order corresponding to the UCI to be transmitted, and $\lceil \ \rceil$ refers to rounding up; and a transmitting module, configured to map the two parts of coded bit sequences that have undergone rate matching onto a Physical Uplink Shared Channel PUSCH, and transmit the two parts of the coded bit sequences to a base station.

In one aspect, the transmitting module includes at least one of the following transmitting units: a first transmitting unit, configured to concatenate the two parts of coded bit sequences that have undergone rate matching to form a new bit sequence, map the new bit sequence onto the PUSCH, and transmit the new bit sequence to the base station; a second transmitting unit, configured to select alternately $4Q_m$ coded bits in one of the two parts of coded bit sequences that have undergone rate matching and $4Q_m$ coded bits in the other part of coded bit sequences that have undergone rate matching to form a new bit sequence, map the new bit sequence onto the PUSCH, and transmit the new bit sequence to the base station; and a third transmitting unit, configured to select alternately $Q_m$ coded bits in one of the two parts of coded bit sequences that have undergone rate matching and $Q_m$ coded bits in the other part of coded bit sequences that have undergone rate matching, and, after $4Q_m$ coded bits are selected, switch the order of selecting alternately the two parts of coded bit sequences that have undergone rate matching, go on selecting the coded bits alternately to form a new bit sequence, map the new bit sequence onto the PUSCH and transmit it to the base station.

In another aspect, the first encoding module includes: a first encoding unit, configured to use Reed Muller (RM) (32, O) code to encode each part of information bit sequence of the UCI to be transmitted, which is divided by the first dividing module, to obtain a 32-bit coded bit sequence respectively; a first obtaining unit, configured to obtain a bit $O_n$ of the information bit sequence corresponding to the first 32-bit coded bit sequence obtained by the first encoding unit, a basic sequence $M_{j,n}$ of the RM (32, O) code, and O' being the number of bits of the information bit sequence corresponding to the first 32-bit coded bit sequence; a first rate matching unit, configured to: select first $\lceil Q'/2 \rceil \times Q_m$ bits in the first 32-bit coded bit sequence obtained by the first encoding unit if the value of $\lceil Q'/2 \rceil \times Q_m$ is less than or equal to 32, or perform rate matching for the first 32-bit coded bit sequence to set the sequence to $\lceil Q'/2 \rceil \times Q_m$ bits coded bit sequence according to $q_i = b_{(i \bmod 32)}$ (i=0,1, . . . , ($\lceil Q'/2 \rceil \times Q_m - 1$)) if the value of $\lceil Q'/2 \rceil \times Q_m$ is greater than 32, wherein $q_i$ is a coded bit sequence output after the first 32-bit coded bit sequence is set to $\lceil Q'/2 \rceil \times Q_m$ bits coded bit sequence through rate matching, $$b_j = \sum_{n=0}^{O'-1} (O_n \times M_{j,n}) \bmod 2$$

(j=0,1, . . . ,31) is the first 32-bit coded bit sequence, and $O_n$, $M_{j,n}$ and O' are parameters obtained by the first obtaining unit; a second obtaining unit, configured to obtain the bit $O_n$ of the information bit sequence corresponding to the second 32-bit coded bit sequence obtained by the first encoding unit, a basic sequence $M_{j,n}$ of the RM (32, O) code, and O' being the number of bits of the information bit sequence corresponding to the second 32-bit coded bit sequence; and a second rate matching unit, configured to: select first $(Q' - \lceil Q'/2 \rceil) \times Q_m$ bits in the second 32-bit coded bit sequence obtained by the first encoding unit if the value of $(Q' - \lceil Q'/2 \rceil) \times Q_m$ is less than or equal to 32, or perform rate matching for the second 32-bit coded bit sequence to set the sequence to $(Q' - \lceil Q'/2 \rceil) \times Q_m$ bits coded bit sequence according to $q_i = b_{(i \bmod 32)}$ (i=0,1, . . . , (($Q' - \lceil Q'/2 \rceil) \times Q_m - 1$)) if the value of $(Q' - \lceil Q'/2 \rceil) \times Q_m$ is greater than 32, wherein $q_i$ is a coded bit sequence output after the second 32-bit coded bit sequence is set to $(Q' - \lceil Q'/2 \rceil) \times Q_m$ bits coded bit sequence through rate matching, $$b_j = \sum_{n=0}^{O'-1} (O_n \times M_{j,n}) \bmod 2$$

(j=0,1, . . . ,31) is the second 32-bit coded bit sequence, and $O_n$, $M_{j,n}$ and O' are parameters obtained by the second obtaining unit.

A base station includes:

a receiving module, configured to receive UCI sent by a terminal, calculate the number Q' of modulation symbols occupied by the UCI, and obtain modulation order $Q_m$ corresponding to the UCI;

a determining module, configured to determine candidate control information bit sequences according to the number of bits of the UCI received by the receiving module;

a second dividing module, configured to divide each candidate control information bit sequence determined by the determining module into two parts;

a second encoding module, configured to use RM (32, O) code to encode each part of each candidate control information bit sequence to obtain a 32-bit coded bit sequence respectively, and perform rate matching for each 32-bit coded bit sequence to set a first 32-bit coded bit sequence to $\lceil Q'/2 \rceil \times Q_m$ bits coded bit sequence through rate matching and to set a second 32-bit coded bit sequence to $(Q' - \lceil Q'/2 \rceil) \times Q_m$ bits coded bit sequence through rate matching, where $Q_m$ is modulation order corresponding to the UCI, and $\lceil \ \rceil$ refers to rounding up; and a detecting module, configured to detect the UCI by using the two parts of coded bit sequences which correspond to each candidate control information bit sequence and have undergone rate matching.

In one aspect, the detecting module includes at least one of the following detecting units: a first detecting unit, configured to concatenate the two parts of coded bit sequences that have undergone rate matching to form a new bit sequence, and use the new bit sequence to detect the Uplink Control Information; a second detecting unit, configured to select alternately $4Q_m$ coded bits in one of the two parts of coded bit sequences that have undergone rate matching and $4Q_m$ coded bits in the other part of coded bit sequences that have undergone rate matching to form a new bit sequence, and use the new bit sequence to detect the Uplink Control Information; and a third detecting unit, configured to select alternately $Q_m$ coded bits in one of the two parts of coded bit sequences that have undergone rate matching and $Q_m$ coded bits in the other part of coded bit sequences that have undergone rate matching, and, after $4Q_m$ coded bits are selected, switch the order of selecting alternately the two parts of coded bit sequences that have undergone rate matching, go on selecting the coded bits alternately to form a new bit sequence, and use the new bit sequence to detect the Uplink Control Information.

In another aspect, the second encoding module includes: a second encoding unit, configured to use Reed Muller (RM) (32, O) code to encode each part of each candidate control information bit sequence to obtain a 32-bit coded bit sequence respectively; a third obtaining unit, configured to obtain a bit $O_n$ of the information bit sequence corresponding to the first 32-bit coded bit sequence obtained by the second encoding unit, a basic sequence $M_{j,n}$ of the RM (32, O) code, and O' being the number of bits of the information bit sequence corresponding to the first 32-bit coded bit sequence; a third rate matching unit, configured to: select first $\lceil Q'/2 \rceil \times Q_m$ bits in the first 32-bit coded bit sequence if the value of $\lceil Q'/2 \rceil \times Q_m$ is less than or equal to 32, or perform rate matching for the first 32-bit coded bit sequence to set the sequence to $\lceil Q'/2 \rceil \times Q_m$ bits coded bit sequence according to $q_i = b_{(i \bmod 32)}$ (i=0,1, . . . , ($\lceil Q'/2 \rceil \times Q_m - 1$)) if the value of $\lceil Q'/2 \rceil \times Q_m$ is greater than 32, wherein $q_i$ is a coded bit sequence output after the first 32-bit coded bit sequence is set to $\lceil Q'/2 \rceil \times Q_m$ coded bit sequence through rate matching, $$b_j = \sum_{n=0}^{O'-1} (O_n \times M_{j,n}) \mod 2$$

(j=0,1, . . . ,31) is the first 32-bit coded bit sequence, and $O_n$, $M_{j,n}$ and O' are parameters obtained by the third obtaining unit; a fourth obtaining unit, configured to obtain a bit $O_n$ of the information bit sequence corresponding to the second 32-bit coded bit sequence obtained by the second encoding unit, a basic sequence $M_{j,n}$ of the RM (32, O) code, and O' being the number of bits of the information bit sequence corresponding to the second 32-bit coded bit sequence; and a fourth rate matching unit, configured to: select first $(Q' - \lceil Q'/2 \rceil) \times Q_m$ bits in the second 32-bit coded bit sequence if the value of $(Q' - \lceil Q/2 \rceil) \times Q_m$ is less than or equal to 32, or perform rate matching for the second 32-bit coded bit sequence to set the sequence to $(Q' - \lceil Q'/2 \rceil) \times Q_m$ bits coded bit sequence according to $q_i = b_{(i \mod 32)}$ (i=0,1, . . . , $((Q' - \lceil Q'/2 \rceil) \times Q_m - 1))$ if the value of $(Q' - \lceil Q'/2 \rceil) \times Q_m$ is greater than 32, wherein $q_i$ is a coded bit sequence output after the second 32-bit coded bit sequence is set to $(Q' - \lceil Q'/2 \rceil) \times Q_m$ bits coded bit sequence through rate matching, $$b_j = \sum_{n=0}^{O'-1} (O_n \times M_{j,n}) \mod 2$$

(j=0,1, . . . ,31) is the second 32-bit coded bit sequence, and $O_n$, $M_{j,n}$ and O' are parameters obtained by the fourth obtaining unit.

A method for receiving UCI includes:
calculating the number Q' of modulation symbols occupied by UCI sent by a terminal, where the UCI includes a first part of UCI and a second part of UCI; and
separating the modulation symbols of the UCI according to Q', where the first part of UCI corresponds to $\lceil Q'/2 \rceil$ modulation symbols and the second part of UCI corresponds to $(Q' - \lceil Q'/2 \rceil)$ modulation symbols.

In one aspect, the $\lceil Q'/2 \rceil$ modulation symbols corresponding to the first part of UCI and the $(Q' - \lceil Q'/2 \rceil)$ modulation symbols corresponding to the second part of UCI are mapped to 4 SC-FDMA symbols respectively.

The technical solution brings the following benefits:
The information bit sequence of the UCI is divided into two parts, and each part is encoded to generate a 32-bit coded bit sequence respectively; rate matching is performed for each 32-bit coded bit sequence respectively and then the coded bit sequence is transmitted, and therefore, the UCI which occupies bits more than the maximum number of bits supported by RM (32, O) code is transmitted properly. Moreover, each part of information bit sequence of the UCI obtains enough coding gain even if $(Q'/2) \times Q_m$ is greater than 24 bits, thereby improving transmission performance of the UCI.

DETAILED DESCRIPTION OF THE EMBODIMENTS

To make the technical solution, objectives and merits clearer, the following describes the embodiments in more detail with reference to accompanying drawings.

Embodiment 1

Figure 1:
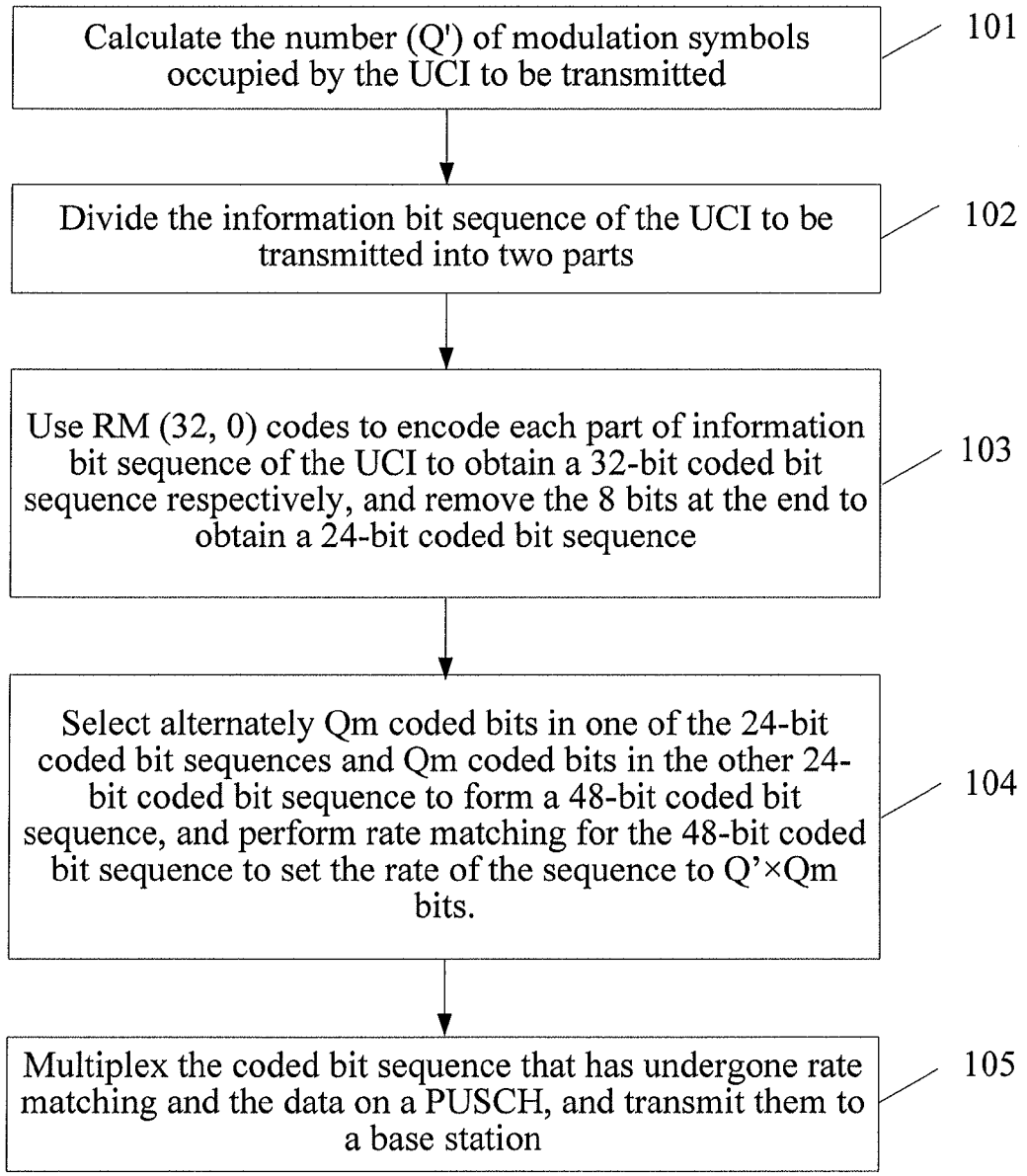
FIG. 1 is a flowchart of a method for transmitting UCI according to Embodiment 1.

As shown in FIG. 1, this embodiment provides a method for transmitting UCI. On the terminal side, the method includes the following steps:

101: Calculate the number Q' of modulation symbols occupied by UCI to be transmitted.

If a PUSCH (Physical Uplink Share Channel, Physical Uplink Share Channel,) corresponds to multiple layers, this step calculates the number of modulation symbols occupied by the UCI on each layer of the PUSCH. The UCI may be ACK (Acknowledgment, Acknowledgment)/NACK (Negative Acknowledgement, Negative Acknowledgement), RI (Rank Indication, Rank Indication), or other control information. The type of the UCI is not limited herein.

Q' is calculated through:

$$Q' = \min\left(\left\lceil \frac{O \times M_{sc}^{PUSCH-initial} \times N_{symb}^{PUSCH-initial} \times \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \times M_{sc}^{PUSCH}\right) \quad (1)$$

In the formula above, O is the number of bits of original information of the UCI; $M_{sc}^{PUSCH-initial}$ is the transmission bandwidth of the PUSCH of the same data transport block transmitted initially; $M_{sc}^{PUSCH}$ is the transmission bandwidth of the PUSCH of the current subframe; $N_{symb}^{PUSCH-initial}$ is the number of SC-FDMA (Single-Carrier Frequency-Division Multiple Access, Single-Carrier Frequency-Division Multiple Access) symbols occupied by the same transport block transmitted initially; $\beta_{offset}^{PUSCH}$ is an offset of the UCI relative to MCS (Modulation and Coding Scheme, Modulation and Coding Scheme) of the data, and $\beta_{offset}^{PUSCH} = \beta_{offset}^{HARQ-ACK}$ when the UCI is HARQ-ACK, or $\beta_{offset}^{PUSCH} = \beta_{offset}^{RI}$, when the UCI is RI, where the values of $\beta_{offset}^{HARQ-ACK}$ and $\beta_{offset}^{RI}$ are signalled by an high layers Radio Resource Control (RRC) signaling, and are selected based on the multiple-input multiple-output (MIMO) transmission mode of the PUSCH; when the PUSCH carries two data transport blocks, $C^{(0)}$ is the number of code blocks generated by segmenting the data corresponding to the first data transport block when performing channel coding, and $C^{(1)}$ is the number of code blocks generated by segmenting the data corresponding to the second data transport block when performing channel coding; $K_r^{(0)}$ is a sum of the number of information bits of block r (namely, the block numbered r) of the first data transport block and the number of Cyclic Redundancy Check (CRC) bits, and $K_r^{(1)}$ is a sum of the number of information bits of block r of the second data transport block and the number of CRC bits; and min refers to taking the minimum value, and $\lceil \; \rceil$ refers to rounding up.

Note that if the PUSCH corresponds to only one data transport block (namely, only one codeword exists), the Q' may be calculated through formula (2). Formula (2) is a result of simplifying formula (1), and the meanings of the symbols in formula (2) are the same as those in formula (1).

$$Q' = \min\left(\left\lceil \frac{O \times M_{sc}^{PUSCH-initial} \times N_{symb}^{PUSCH-initial} \times \beta_{offset}^{PUSCH}}{\sum_{r=0}^{C-1} K_r} \right\rceil, 4 \times M_{sc}^{PUSCH}\right) \quad (2)$$

In the formula above, C is the number of code blocks generated by dividing the data corresponding to the data transport block at the time of channel coding; and $K_r$ is the sum of the number of information bits of block r of the data transport block and the number of CRC bits.

102: Divide the information bit sequence of the UCI to be transmitted into two parts.

Note that in this embodiment, the information bit sequence of the UCI refers to the original information bit sequence of the UCI. For example, if the UCI to be transmitted is ACK/NACK composed of 12 bits, the information bit sequence in this embodiment is one of the corresponding 4096 information bit sequences, for example, 12 zeros.

This embodiment does not restrict the method of dividing the information bit sequence of the UCI into two parts. Preferably, the dividing method is: If the number of bits of the UCI is an even number, the information bit sequence is divided into two equal parts; if the number of bits of the UCI is an odd number, the information bit sequence is divided into two parts, with one part being greater than the other part by one bit.

103: Use RM (32, O) code to encode each part of information bit sequence of the UCI to obtain a 32-bit coded bit sequence respectively, and remove the 8 bits at the end to obtain a 24-bit coded bit sequence.

104: Select alternately $Q_m$ coded bits in one of the 24-bit coded bit sequences and $Q_m$ coded bits in the other 24-bit coded bit sequence to form a 48-bit coded bit sequence, and perform rate matching for the 48-bit coded bit sequence to set the sequence to $Q' \times Q_m$ bits coded bit sequence.

$Q_m$ above is the modulation order corresponding to the UCI to be transmitted.

105: Map the coded bit sequence that has undergone rate matching onto a PUSCH, and transmit the coded bit sequence to a base station.

Figure 2:
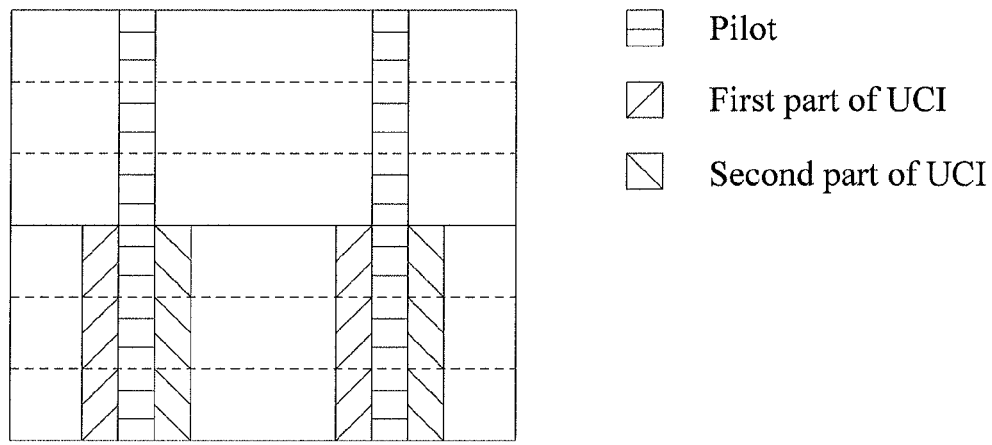
FIG. 2 is a schematic diagram of UCI resource mapping on each layer of PUSCH according to Embodiment 1.

FIG. 2 is a schematic diagram of UCI resource mapping on each layer of PUSCH.

In the transmission method provided in this embodiment, the information bit sequence of the UCI is divided into two parts, and each part is encoded by using RM (32, O) code to obtain a 32-bit coded bit sequence respectively; and the 8 bits at the end are removed to obtain a 24-bit coded bit sequence; a 48-bit coded bit sequence is generated by selecting alternately $Q_m$ coded bits in one of the 24-bit coded bit sequences and $Q_m$ coded bits in the other 24-bit coded bit sequence; and rate matching is performed for the 48-bit coded bit sequence to set the sequence to $Q' \times Q_m$ bits coded bit sequence before transmission. In this way, the UCI is transmitted properly even if the number of bits occupied by the UCI exceeds the maximum number of bits supported by the RM (32, O) code.

Figure 3:
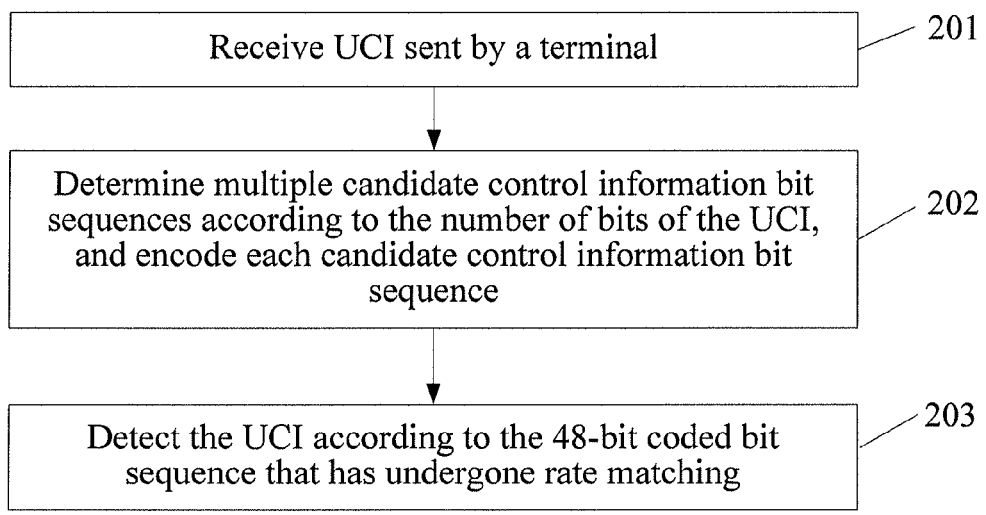
FIG. 3 is a flowchart of a method for receiving UCI according to Embodiment 1.

As shown in FIG. 3, this embodiment provides a method for receiving UCI. On the base station side, the method includes the following steps:

201: Receive UCI sent by a terminal.

This step includes the following two steps:

201a: Calculate the number Q' of modulation symbols occupied by the UCI sent by the terminal.

This step is the same as step 101.

201b: Separate the UCI transmitted together with the data according to Q'.

In this step, the base station separates the UCI transmitted together with the data, and specifically, separates the modulation symbols corresponding to the UCI transmitted together with the data, according to the number of modulation symbols occupied by the UCI in step 201a and the resource location shown in FIG. 2, or, further according to the step of channel deinterleaving.

202: Determine multiple candidate control information bit sequences according to the number of bits of the UCI, and encode each candidate control information bit sequence.

Specifically, find all the bit sequences which include bits with the number equivalent to the number of bits of the UCI to be detected, and use the bit sequences as candidate control information bit sequences. For example, when the number of bits of UCI transmitted together with the data is 12, there are $2^{12}$ candidate control information bit sequences.

The base station encodes each candidate control information bit sequence respectively, and the encoding includes the following steps:

202a: Divide each candidate control information bit sequence into two parts.

202b: Use RM (32, O) code to encode each part of the candidate control information bit sequence to obtain a 32-bit coded bit sequence respectively, and remove the 8 bits at the end to obtain a 24-bit coded bit sequence.

202c: Select alternately $Q_m$ coded bits in one of the 24-bit coded bit sequences and $Q_m$ coded bits in the other 24-bit coded bit sequence to form a 48-bit coded bit sequence, and perform rate matching for the 48-bit coded bit sequence to set the rate of the sequence to $Q' \times Q_m$ bits.

203: Detect the UCI according to the coded bit sequence that has undergone rate matching.

The detection criteria in this step come in many types such as maximum likelihood, and are not limited herein.

The receiving method provided in this embodiment corresponds to the transmitting method provided in this embodiment. Through this receiving method, the terminal side can transmit UCI according to the transmission method provided in this embodiment, and therefore, the UCI can be transmitted properly even if the number of bits occupied by the UCI exceeds the maximum number of bits supported by RM (32, O) code.

Embodiment 2

Figure 4:
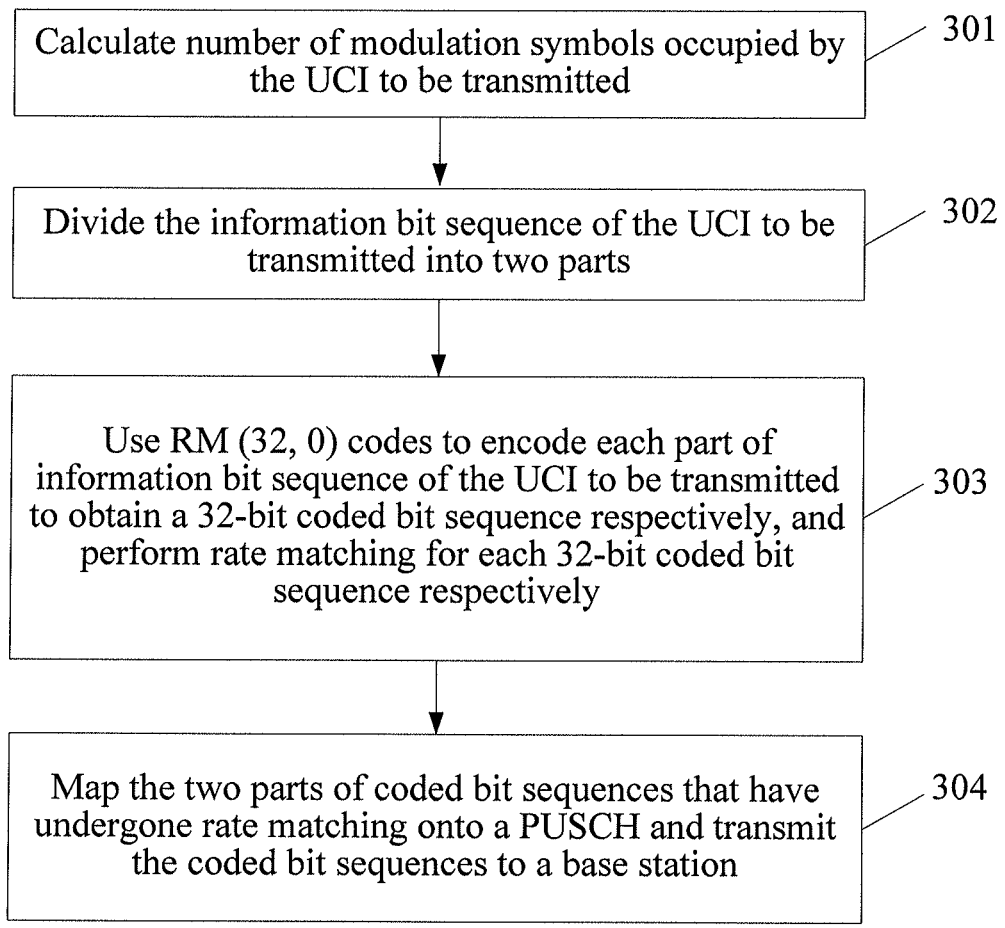
FIG. 4 is a flowchart of a method for transmitting UCI according to Embodiment 2.

As shown in FIG. 4, this embodiment provides a method for transmitting UCI. The method includes:

301: Calculate the number Q' of modulation symbols occupied by UCI to be transmitted.

302: Divide the information bit sequence of the UCI to be transmitted into two parts.

303: Use RM (32, O) code to encode each part of the information bit sequence of the UCI to be transmitted to obtain a 32-bit coded bit sequence respectively, and perform rate matching for each 32-bit coded bit sequence to set the first 32-bit coded bit sequence to $\lceil Q'/2 \rceil \times Q_m$ bits coded bit sequence through rate matching and to set the second 32-bit coded bit sequence to $(Q'-\lceil Q'/2 \rceil) \times Q_m$ bits coded bit sequence through rate matching, where $Q_m$ is modulation order corresponding to the UCI to be transmitted, and $\lceil\ \rceil$ refers to rounding up.

304: Map the two parts of coded bit sequences that have undergone rate matching onto a PUSCH and transmit the two parts of the coded bit sequences to a base station.

Figure 5:
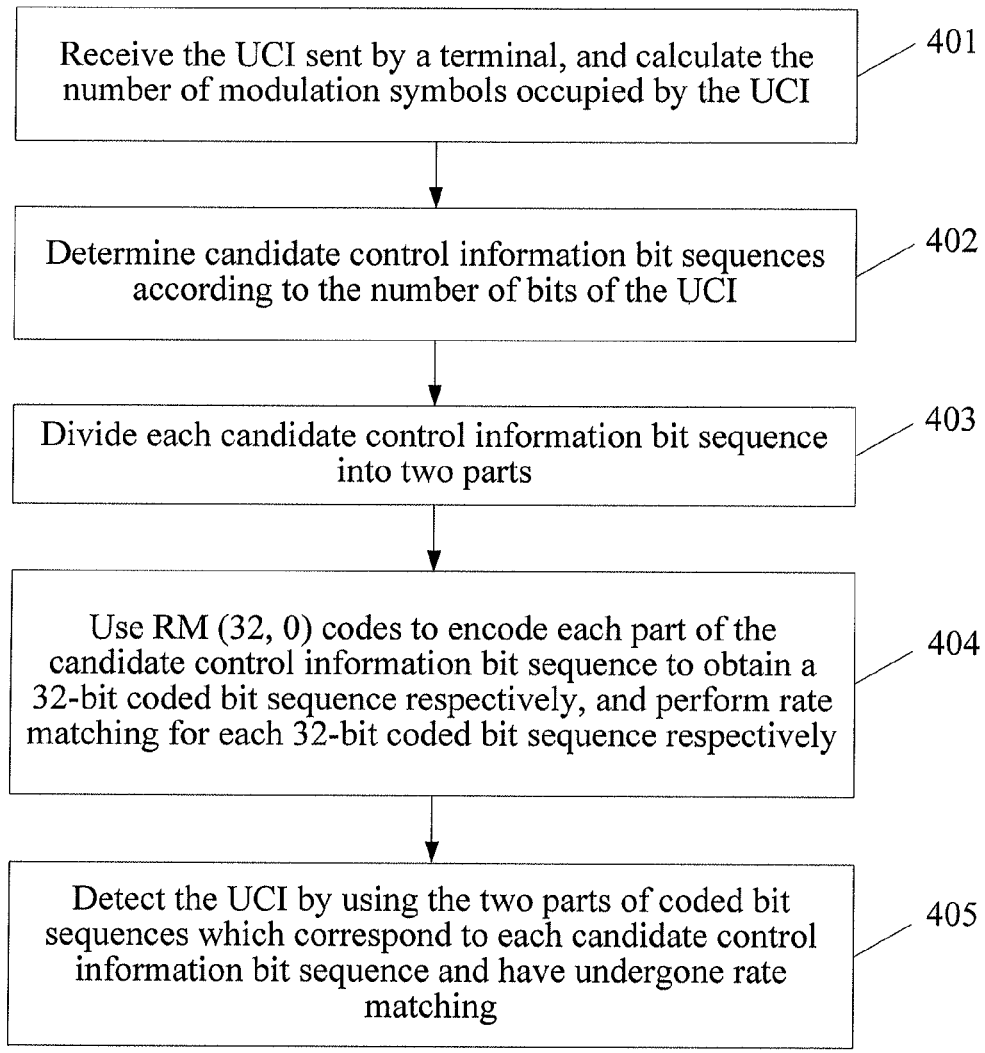
FIG. 5 is a flowchart of a method for receiving UCI according to Embodiment 2.

As shown in FIG. 5, this embodiment provides a method for receiving UCI. The method includes:

401: Receive the UCI sent by the terminal, and calculate the number Q' of modulation symbols occupied by the UCI.

402: Determine candidate control information bit sequences according to the number of bits of the UCI.

403: Divide each candidate control information bit sequence into two parts.

404: Use RM (32, O) code to encode each part of each candidate control information bit sequence to obtain a 32-bit coded bit sequence respectively, and perform rate matching for each 32-bit coded bit sequence to set the first 32-bit coded bit sequence to $\lceil Q'/2 \rceil \times Q_m$ bits coded bit sequence through rate matching and to set the second 32-bit coded bit sequence to $(Q'-\lceil Q'/2 \rceil) \times Q_m$ bits coded bit sequence through rate matching, where $Q_m$ is modulation order corresponding to the UCI, and $\lceil\ \rceil$ refers to rounding up.

405: Detect the UCI by using the two parts of coded bit sequences which correspond to each candidate control information bit sequence and have undergone rate matching.

Through the transmitting method provided in this embodiment, the information bit sequence of the UCI is divided into two parts, and each part is encoded to generate a 32-bit coded bit sequence respectively; rate matching is performed for each 32-bit coded bit sequence respectively and then the coded bit sequence is transmitted, and therefore, the UCI which occupies bits more than the maximum number of bits supported by RM (32, O) code is transmitted properly. Compared with the technical solution in Embodiment 1 above, this embodiment makes each part of information bit sequence of the UCI obtain enough coding gain even if the $(Q'/2) \times Q_m$ is greater than 24 bits, thereby improving transmission performance of the UCI.

The receiving method provided in this embodiment corresponds to the transmitting method provided in this embodiment. Through this receiving method, the terminal side can transmit UCI according to the transmission method provided in this embodiment, and therefore, the UCI can be transmitted properly even if the number of bits occupied by the UCI exceeds the maximum number of bits supported by RM (32, O) code. Compared with the technical solution in Embodiment 1 above, this embodiment makes each part of information bit sequence of the UCI obtain enough coding gain even if the $(Q'/2) \times Q_m$ is greater than 24 bits, thereby improving transmission performance of the UCI.

Embodiment 3

Figure 6:
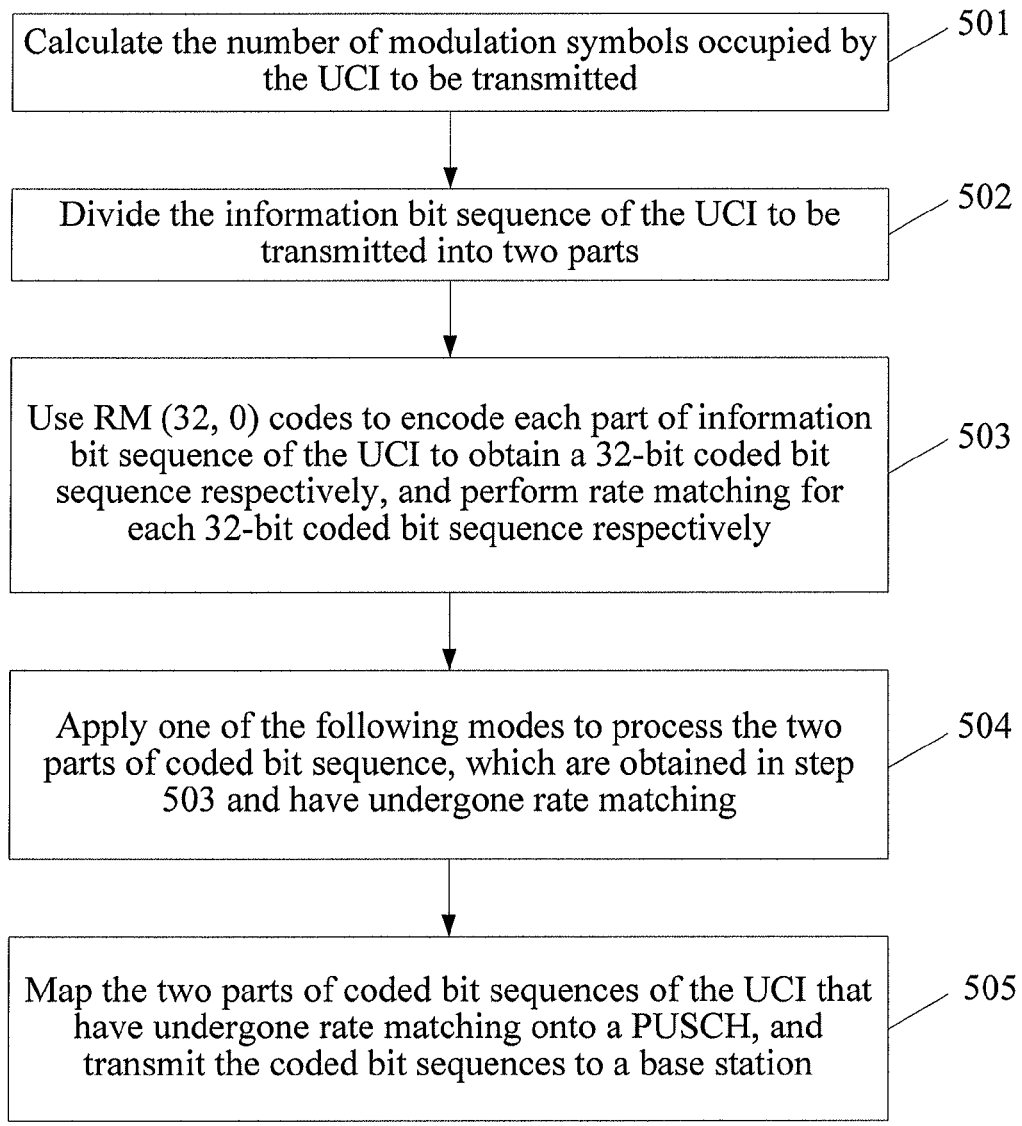
FIG. 6 is a flowchart of a method for transmitting UCI according to Embodiment 3.

As shown in FIG. 6, this embodiment provides a method for transmitting UCI. On the terminal side, the method includes the following steps:

501: Calculate the number Q' of modulation symbols occupied by the UCI to be transmitted.

This step is the same as step 101, and is described briefly below.

If the PUSCH corresponds to multiple layers, this step calculates the number of modulation symbols occupied by the UCI on each layer of the PUSCH. The UCI may be ACK (Acknowledgment, Acknowledgment)/NACK (Negative Acknowledgement, Negative Acknowledgement), RI (Rank Indication, Rank Indication), or other control information. The type of the UCI is not limited herein.

Q' is calculated through:

$$Q' = \min\left(\left\lceil \frac{O \times M_{sc}^{PUSCH-initial} \times N_{symb}^{PUSCH-initial} \times \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \times M_{sc}^{PUSCH}\right) \quad (1)$$

In the formula above, O is the number of bits of original information of the UCI; $M_{sc}^{PUSCH-initial}$ is the transmission bandwidth of the PUSCH of the same data transport block transmitted initially; $M_{sc}^{PUSCH}$ is the transmission bandwidth of the PUSCH of the current subframe; $N_{symb}^{PUSCH-initial}$ is the number of SC-FDMA (Single-Carrier Frequency-Division Multiple Access, Single-Carrier Frequency-Division Multiple Access) symbols occupied by the same transport block transmitted initially; $\beta_{offset}^{PUSCH}$ is an offset of the UCI relative to MCS (Modulation and Coding Scheme, Modulation and Coding Scheme) of the data, and $\beta_{offset}^{PUSCH} = \beta_{offset}^{HARQ-ACK}$ when the UCI is HARQ-ACK, or $\beta_{offset}^{PUSCH} = \beta_{offset}^{RI}$ when the UCI is RI, where the values of $\beta_{offset}^{HARQ-ACK}$ and $\beta_{offset}^{RI}$ are signalled by an high layers RRC signaling, and are selected based on the MIMO transmission mode of the PUSCH; when the PUSCH carries two data transport blocks, $C^{(0)}$ is the number of code blocks generated by segmenting the data corresponding to the first data transport block when performing channel coding, and $C^{(1)}$ is the number of code blocks generated by segmenting the data corresponding to the second data transport block when performing channel coding; $K_r^{(0)}$ is a sum of the number of information bits of block r (namely, the block numbered r) of the first data transport block and the number of CRC bits, and $K_r^{(1)}$ is a sum of the number of information bits of block r of the second data transport block and the number of CRC bits; and min refers to taking the minimum value, and $\lceil\ \rceil$ refers to rounding up.

Note that if the PUSCH corresponds to only one data transport block (namely, only one codeword exists), the Q' may be calculated through formula (2). Formula (2) is a result of simplifying formula (1), and the meanings of the symbols in formula (2) are the same as those in formula (1).

$$Q' = \min\left(\left\lceil \frac{O \times M_{sc}^{PUSCH-initial} \times N_{symb}^{PUSCH-initial} \times \beta_{offset}^{PUSCH}}{\sum_{r=0}^{C-1} K_r} \right\rceil, 4 \times M_{sc}^{PUSCH}\right) \quad (2)$$

In the formula above, C is the number of code blocks generated by segmenting the data corresponding to the data transport block when performing channel coding; and $K_r$ is the sum of the number of information bits of block r of the data transport block and the number of CRC bits.

502: Divide the information bit sequence of the UCI to be transmitted into two parts.

Note that in this embodiment, the information bit sequence of the UCI refers to the original information bit sequence of the UCI. For example, if the UCI to be transmitted is ACK/NACK composed of 12 bits, the information bit sequence in this embodiment is one of the corresponding 4096 information bit sequences, for example, 12 zeros.

This embodiment does not restrict the method of dividing the information bit sequence of the UCI into two parts. Preferably, the dividing method is: If the number of bits of the UCI is an even number, the information bit sequence is divided into two equal parts; if the number of bits of the UCI is an odd number, the information bit sequence is divided into two parts, with one part being greater than the other part by one bit.

503: Use RM (32, O) code to encode each part of the information bit sequence of the UCI to obtain a 32-bit coded bit sequence respectively, and perform rate matching for each 32-bit coded bit sequence to set the first 32-bit coded bit sequence to $\lceil Q'/2 \rceil \times Q_m$ bits coded bit sequence through rate matching and to set the second 32-bit coded bit sequence to $(Q'-\lceil Q'/2 \rceil) \times Q_m$ bits coded bit sequence through rate matching.

One of the two 32-bit coded bit sequences is the first 32-bit coded bit sequence, and the other is the second 32-bit coded bit sequence. Specifically, after the rate matching, the first 32-bit coded bit sequence is set to $\lceil Q'/2 \rceil \times Q_m$ bits coded bit sequence, and the second 32-bit coded bit sequence is set to $(Q'-\lceil Q'/2 \rceil) \times Q_m$ bit coded bit sequence; or, the first 32-bit coded bit sequence is set to $(Q'-\lceil Q/2 \rceil) \times Q_m$ bits coded bit sequence, and the second 32-bit coded bit sequence is set to $\lceil Q'/2 \rceil \times Q_m$ bits coded bit sequence. If Q' is an even number, because $\lceil Q'/2 \rceil \times Q_m = (Q'-\lceil Q'/2 \rceil) \times Q_m = (Q'/2) \times Q_m$, the foregoing process is equivalent to: performing rate matching so that the number of coded bits of each 32-bit coded bit sequence is $(Q'/2) \times Q_m$ bits.

$Q_m$ is the modulation order corresponding to the UCI to be transmitted. In other words, $Q_m$ is the modulation order corresponding to the data transport block multiplexed with the UCI. If the data transport block corresponds to multiple layers, $Q_m$ is also known as the modulation order corresponding to the data on the layer which the UCI is mapped onto. The terminal is generally signalled of $Q_m$ by the base station beforehand, and therefore, the terminal and the base station know the value of $Q_m$ be forehand.

Specifically, the step of setting the first 32-bit coded bit sequence to $\lceil Q'/2 \rceil \times Q_m$ bits coded bit sequence through rate matching includes:

If the value of $\lceil Q'/2 \rceil \times Q_m$ is less than or equal to 32 bits, selecting the first $\lceil Q'/2 \rceil \times Q_m$ bits in the first 32-bit coded bit sequence;

If the value of $\lceil Q'/2 \rceil \times Q_m$ is greater than 32 bits, according to $q_i = b_{(i \mod 32)}$ (i=0,1, . . . , ($\lceil Q'/2 \rceil \times Q_m - 1$)), performing rate matching to set the first 32-bit coded bit sequence to $\lceil Q'/2 \rceil \times Q_m$ bits coded bit sequence, where $q_i$ is the coded bit sequence output after the first 32-bit coded bit sequence is set to $\lceil Q'/2 \rceil \times Q_m$ bits coded bit sequence through rate matching, $$b_j = \sum_{n=0}^{O'} (O_n \times M_{j,n}) \mod 2$$

(j=0,1, . . . ,31) is the first 32-bit coded bit sequence, $O_n$ is the bit in the information bit sequence corresponding to the first 32-bit coded bit sequence, $M_{j,n}$ is a basic sequence (shown in Table 1) of RM (32, O) code, and O' is the number of bits of the information bit sequence corresponding to the first 32-bit coded bit sequence. In this case, considering that O' is the number of bits of the information bit sequence corresponding to the first 32-bit coded bit sequence and $O_n$ is the bit in the information bit sequence corresponding to the first 32-bit coded bit sequence, when n starts from 0, no bit like $O_{O'}$ exists in the information bit sequence corresponding to the first 32-bit coded bit sequence. In other words, no $O_{O'}$ bit exists. Therefore, the formula $$b_j = \sum_{n=0}^{O'} (O_n \times M_{j,n}) \mod 2$$

is equivalent to the formula $$b_j = \sum_{n=0}^{O'-1} (O_n \times M_{j,n}) \mod 2.$$

Specifically, the setting the second 32-bit coded bit sequence to $(Q'-\lceil Q'/2 \rceil) \times Q_m$ bits coded bit sequence through rate matching includes:

If the value of $(Q'-\lceil Q'/2 \rceil) \times Q_m$ is less than or equal to 32 bits, selecting the first $(Q'-\lceil Q'/2 \rceil) \times Q_m$ bits in the second 32-bit coded bit sequence;

If the value of $(Q'-\lceil Q'/2 \rceil) \times Q_m$ is greater than 32 bits, according to $q_i = b_{(i \mod 32)}$ (i=0,1, . . . , (($Q'-\lceil Q'/2 \rceil) \times Q_m - 1$)), performing rate matching to set the second 32-bit coded bit sequence to $(Q'-\lceil Q'/2 \rceil) \times Q_m$ bits coded bit sequence, where $q_i$ is the coded bit sequence output after the second 32-bit coded bit sequence is set to $(Q'-\lceil Q'/2 \rceil) \times Q_m$ bits coded bit sequence through rate matching, $$b_j = \sum_{n=0}^{O'} (O_n \times M_{j,n}) \mod 2$$

(j=0,1, . . . ,31) is the second 32-bit coded bit sequence, $O_n$ is the bit in the information bit sequence corresponding to the second 32-bit coded bit sequence, $M_{j,n}$ is a basic sequence of RM (32, O) code, and O' is the number of bits of the information bit sequence corresponding to the second 32-bit coded bit sequence. In this case, considering that O' is the number of bits of the information bit sequence corresponding to the second 32-bit coded bit sequence and $O_n$ is the bit in the information bit sequence corresponding to the second 32-bit coded bit sequence, when n starts from 0, no bit like $O_{O'}$ exists in the information bit sequence corresponding to the second 32-bit coded bit sequence. In other words, no $O_{O'}$ bit exists. Therefore, the formula $$b_j = \sum_{n=0}^{O'} (O_n \times M_{j,n}) \bmod 2$$

is equivalent to the formula $$b_j = \sum_{n=0}^{O'-1} (O_n \times M_{j,n}) \bmod 2.$$

Mode 2: Based on the two parts of coded bit sequences that have undergone rate matching, generate a new bit sequence by selecting alternately $4Q_m$ coded bits in one part and $4Q_m$ coded bits in the other part. In other words, select $4Q_m$ coded bits in the first 32-bit coded bit sequence that has undergone rate matching, and then select $4Q_m$ coded bits in the second 32-bit coded bit sequence that has undergone rate matching, and go on selecting alternately the coded bits in the first part and the coded bits in the second part until the two parts of coded bit sequences that have undergone rate matching are finished; and Mode 3: Select alternately $Q_m$ coded bits in one of the two parts of the coded bit sequences that have undergone rate matching and $Q_m$ coded bits in the other part of coded bit sequence; after $4Q_m$ coded bits are selected, switch the order of selecting alternately the two parts of coded bit sequences

TABLE 1

|    | $M_{j,0}$ | $M_{j,1}$ | $M_{j,2}$ | $M_{j,3}$ | $M_{j,4}$ | $M_{j,5}$ | $M_{j,6}$ | $M_{j,7}$ | $M_{j,8}$ | $M_{j,9}$ | $M_{j,10}$ |
|----|---|---|---|---|---|---|---|---|---|---|---|
| 0  | 1 | 1 | 0 | 0 | 0 | 0 | 0 | 0 | 0 | 0 | 1 |
| 1  | 1 | 1 | 1 | 0 | 0 | 0 | 0 | 0 | 0 | 1 | 1 |
| 2  | 1 | 0 | 0 | 1 | 0 | 0 | 1 | 0 | 1 | 1 | 1 |
| 3  | 1 | 0 | 1 | 1 | 0 | 0 | 0 | 0 | 1 | 0 | 1 |
| 4  | 1 | 1 | 1 | 1 | 0 | 0 | 0 | 1 | 0 | 0 | 1 |
| 5  | 1 | 1 | 0 | 0 | 1 | 0 | 1 | 1 | 1 | 0 | 1 |
| 6  | 1 | 0 | 1 | 0 | 1 | 0 | 1 | 0 | 1 | 1 | 1 |
| 7  | 1 | 0 | 0 | 1 | 1 | 0 | 0 | 1 | 1 | 0 | 1 |
| 8  | 1 | 1 | 0 | 1 | 1 | 0 | 0 | 1 | 0 | 1 | 1 |
| 9  | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Note that the rate matching method greater than 32 bits may be called a circular repetition rate matching method, or all the rate matching methods under each mode, including the rate matching method less than or equal to 32 bits and the rate matching method greater than 32 bits, are collectively called "the circular repetition rate matching method".

In this step, each part of the information bit sequence of the UCI is encoded to generate a 32-bit coded bit sequence respectively, and rate matching is performed by circular repetition for each 32-bit coded bit sequence, and therefore, compared with Embodiment 1 above, this embodiment makes each part of information bit sequence of the UCI obtain enough coding gain when $(Q'/2) \times Q_m$ is greater than 24 bits, and improves transmission performance of the UCI.

504: Apply one of the following modes to process the two parts of coded bit sequence, which are obtained in step 503 and have undergone rate matching:

Mode 1: Concatenate the two parts of coded bit sequences that have undergone rate matching to form a new bit sequence;

that have undergone rate matching, and go on selecting the coded bits alternately to form a new bit sequence. In other words, based on the two 32-bit coded bit sequences that have undergone rate matching, select $Q_m$ coded bits in the first 32-bit coded bit sequence, and then select $Q_m$ coded bits in the second 32-bit coded bit sequence, and go on selecting the coded bits alternately; after $4Q_m$ coded bits are selected, switching the selection order, namely, select $Q_m$ coded bits in the second 32-bit coded bit sequence, and then select $Q_m$ coded bits in the first 32-bit coded bit sequence, and go on selecting the coded bits alternately; repeat the foregoing process until the two parts of coded bit sequences that have undergone rate matching are finished.

This step is optional. That is, step 504 may be performed or not.

505: Map the two parts of coded bit sequences of the UCI that have undergone rate matching onto a PUSCH, and transmit the two parts of the coded bit sequences to a base station.

If step 504 is not performed in this embodiment, the two parts of coded bit sequences, which are obtained in step 503 and have undergone rate matching, may be mapped onto the PUSCH, and transmitted to the base station.

Figure 7:
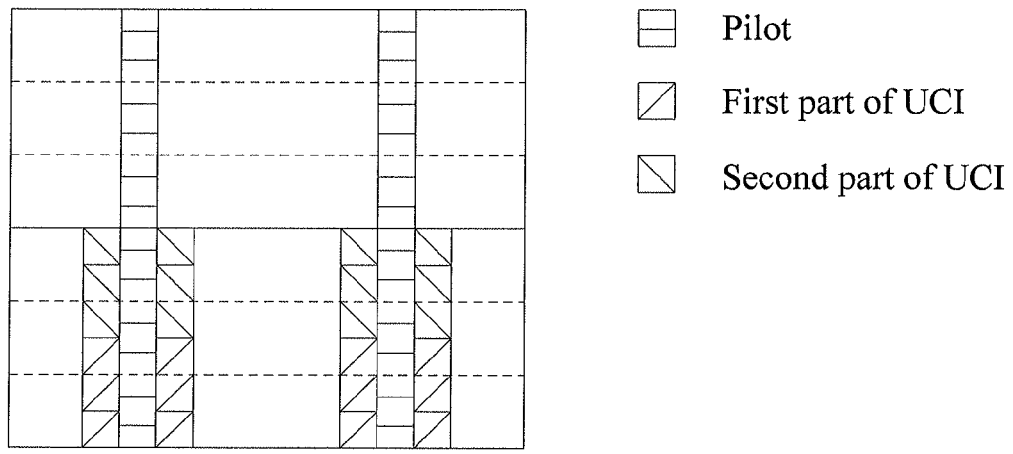
FIG. 7 is a schematic diagram of UCI resource mapping on each layer of PUSCH corresponding to mode 1 according to Embodiment 3.
Figure 8:
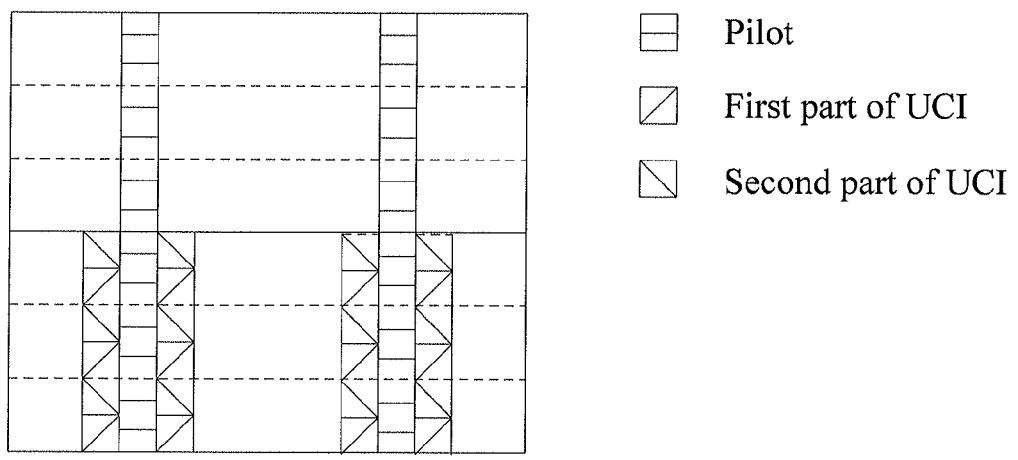
FIG. 8 is a schematic diagram of UCI resource mapping on each layer of PUSCH corresponding to mode 2 according to Embodiment 3.
Figure 9:
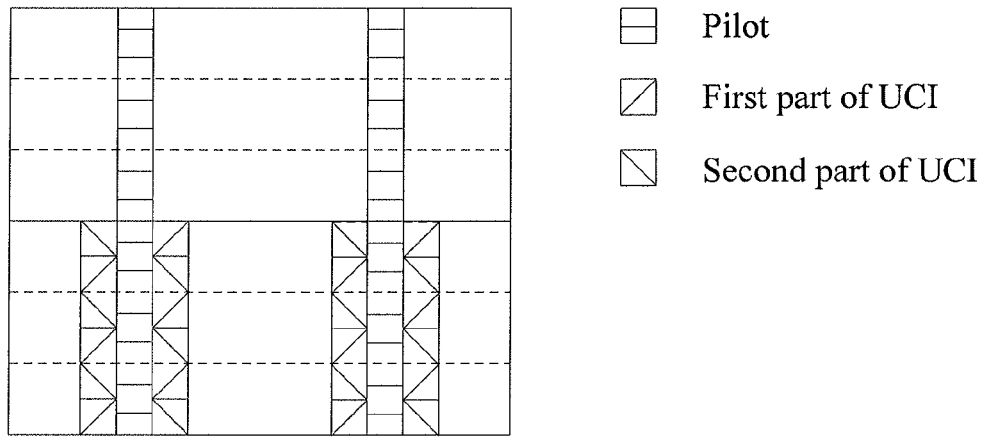
FIG. 9 is a schematic diagram of UCI resource mapping on each layer of PUSCH corresponding to mode 3 according to Embodiment 3.

If step 504 is performed in this embodiment, the two parts of coded bit sequences, which are obtained in step 503 and have undergone rate matching, are processed in step 504 to generate a new bit sequence, and the new bit sequence is mapped onto the PUSCH and transmitted to the base station. Specifically, if mode 1 in step 504 is applied, the new bit sequence is mapped onto the PUSCH and transmitted, and the UCI resource mapping on each layer of the PUSCH is shown in FIG. 7; if mode 2 in step 504 is applied, the new bit sequence is mapped onto the PUSCH and transmitted, and the UCI resource mapping on each layer of the PUSCH is shown in FIG. 8; if mode 3 in step 504 is applied, the new bit sequence is mapped onto the PUSCH and transmitted, and the UCI resource mapping on each layer of the PUSCH is shown in FIG. 9.

In the resource mapping of the technical solution of Embodiment 1 shown in FIG. 2, the bit sequence corresponding to each part of the UCI in the technical solution of Embodiment 1 is mapped onto only two of the 4 SC-FDMA symbols. By contrast, in this embodiment, after mode 1, mode 2 or mode 3 in this embodiment is applied, the bit sequence corresponding to each part of the UCI may be mapped to 4 SC-FDMA symbols. That is, the bit sequence corresponding to each part of the UCI is distributed on the time-frequency resources discretely, thereby achieving enough time diversity gain and frequency diversity gain and improving transmission performance of the UCI.

The step of mapping the two parts of coded bit sequences that have undergone rate matching onto the PUSCH and transmitting the coded bit sequences to the base station further includes: performing channel interleaving, scrambling, modulation, Discrete Fourier Transformation (DFT) and resource mapping for the two parts of coded bit sequences that have undergone rate matching, data, and other UCI information such as CQI, which are then transmitted to the base station. The specific mapping method is not limited in this embodiment, and may be a method in the prior art.

Figure 10:
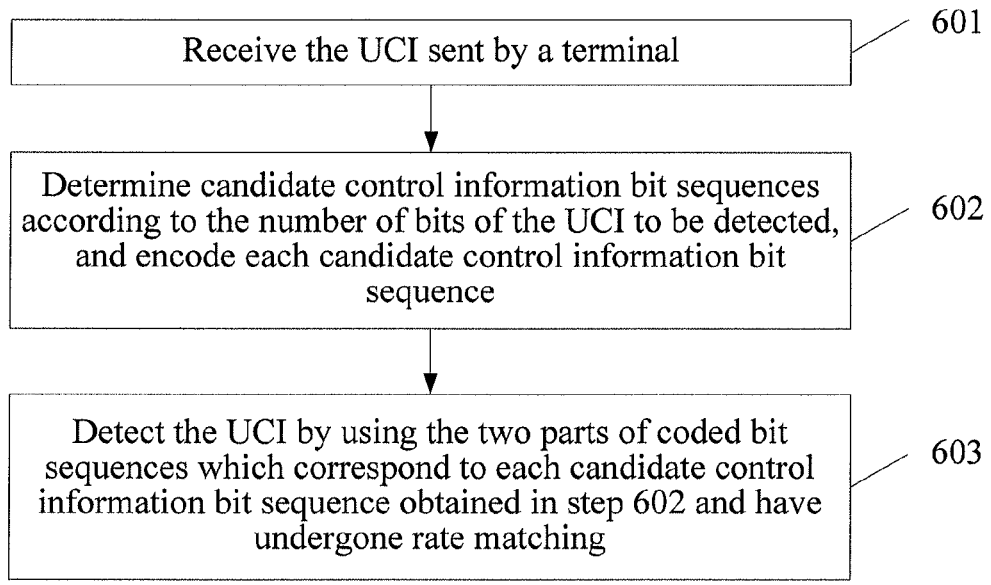
FIG. 10 is a flowchart of a method for receiving UCI according to Embodiment 3.

The base station receives the UCI transmitted together with the data. As shown in FIG. 10, this embodiment provides a method for receiving UCI. The method includes the following steps:

601: Receive UCI sent by a terminal.

This step includes the following two steps:

601a: Calculate the number $Q'$ of modulation symbols occupied by the UCI sent by the terminal.

If the PUSCH corresponds to multiple layers, this step calculates the number of modulation symbols occupied by the UCI on each layer of the PUSCH.

This step is the same as step 501.

601b: Separate the UCI transmitted together with the data according to $Q'$.

In this step, the base station separates the UCI transmitted together with the data, and specifically, separates the modulation symbols corresponding to the UCI transmitted together with the data, according to the number of modulation symbols occupied by the UCI in step 601a, or further according to the step of channel de-interleaving.

If step 504 is performed in this embodiment, the base station in this step may, according to the corresponding mode in step 504, separate the modulation symbols corresponding to each part of the coded bit sequence that has undergone rate matching in step 503. If mode 1 in step 504 is applied to combine the two parts of coded bit sequences that have undergone rate matching in step 503, this step may separate the modulation symbols corresponding to each part of UCI respectively according to the resource location shown in FIG. 7; if mode 2 in step 504 is applied to combine the two parts of coded bit sequences that have undergone rate matching in step 503, this step may separate the modulation symbols corresponding to each part of UCI respectively according to the resource location shown in FIG. 8; if mode 3 in step 504 is applied to combine the two parts of coded bit sequences that have undergone rate matching in step 503, this step may separate the modulation symbols corresponding to each part of UCI respectively according to the resource location shown in FIG. 9.

602: Determine candidate control information bit sequences according to the number of bits of the UCI to be detected, and encode each candidate control information bit sequence.

Specifically, find all the bit sequences which include bits with the number equivalent to the number of bits of the UCI to be detected, and use the bit sequences as candidate control information bit sequences. For example, when the number of bits of UCI transmitted together with the data is 12, there are $2^{12}$ candidate control information bit sequences.

The base station encodes each candidate control information bit sequence respectively, and the encoding includes the following steps:

602a: Divide each candidate control information bit sequence into two parts.

This step is the same as step 502.

602b: Use RM (32, O) code to encode each part of the candidate control information bit sequence to obtain a 32-bit coded bit sequence respectively, and perform rate matching for each 32-bit coded bit sequence to set the first 32-bit coded bit sequence to $\lceil Q'/2 \rceil \times Q_m$ bits coded bit sequence through rate matching and to set the second 32-bit coded bit sequence to $(Q' - \lceil Q'/2 \rceil) \times Q_m$ bits coded bit sequence through rate matching, where $Q_m$ is modulation order corresponding to the UCI, and $\lceil \ \rceil$ refers to rounding up.

This step is the same as step 503.

602c: In the same way as step 504, combine the two parts of coded bit sequences which are obtained in step 602b and have undergone rate matching.

This step is optional. If step 504 is performed on the User Equipment (UE), step 602c needs to be performed in this embodiment; if step 504 is not performed on the UE, step 602c does not need to be performed in this embodiment.

603: Detect the UCI by using the two parts of coded bit sequences which correspond to each candidate control information bit sequence and have undergone rate matching, with a view to judging whether the candidate control information bit sequence is the UCI bit sequence transmitted by the UE.

If step 602c is not performed in this embodiment, this step detects the UCI to be detected according to the two parts of coded bit sequences which are obtained in step 602 and have undergone rate matching; if step 602c is performed in this embodiment, this step detects the UCI to be detected according to the new bit sequence which is obtained in step 602.

The detection criteria in this step come in many types. Taking the maximum likelihood detection as an example, the base station encodes each candidate control information bit sequence according to step 602, modulates the encoded candidate control information bit sequence, conjugate-multiplies the modulated result by the modulation symbols corresponding to the UCI separated in step 601, adds up the products to obtain a sum, and takes the real part of the sum as a likelihood value; or, the base station conjugate-multiplies the local pilot symbol by the received pilot symbol, adds up the products corresponding to multiple pilot symbols to obtain a first sum, adds up the products corresponding to the candidate control information to obtain a second sum, adds the first sum to the second sum to obtain a new sum, and takes the real part of the new sum as a likelihood value; the base station uses the candidate control information bit sequence corresponding to the greatest likelihood value as the UCI bit sequence transmitted by the UE.

Through the transmitting method provided in this embodiment, the information bit sequence of the UCI is divided into two parts, and each part is encoded to generate a 32-bit coded bit sequence respectively; rate matching is performed for each 32-bit coded bit sequence respectively and then the coded bit sequence is transmitted, and therefore, the UCI which occupies bits more than the maximum number of bits supported by RM (32, O) code is transmitted properly. Compared with the technical solution in Embodiment 1 above, this embodiment makes each part of information bit sequence of the UCI obtain enough coding gain even if the $(Q'/2) \times Q_m$ is greater than 24 bits, thereby improving transmission performance of the UCI.

The receiving method provided in this embodiment corresponds to the transmitting method provided in this embodiment. Through this receiving method, the terminal side can transmit UCI according to the transmission method provided in this embodiment, and therefore, the UCI can be transmitted properly even if the number of bits occupied by the UCI exceeds the maximum number of bits supported by RM (32, O) code. Compared with the technical solution in Embodiment 1 above, this embodiment makes each part of information bit sequence of the UCI obtain enough coding gain even if the $(Q'/2) \times Q_m$ is greater than 24 bits, thereby improving transmission performance of the UCI.

Embodiment 4

Figure 11:
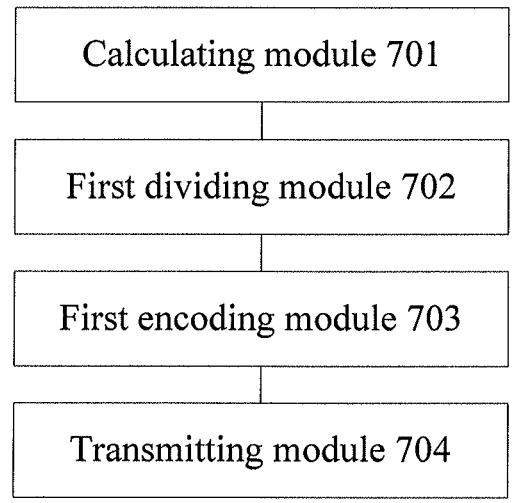
FIG. 11 is a schematic structure diagram of a terminal according to Embodiment 4.

As shown in FIG. 11, a terminal provided in this embodiment includes:

a calculating module 701, configured to calculate the number Q' of modulation symbols occupied by UCI to be transmitted, and obtain modulation order $Q_m$ corresponding to the UCI to be transmitted;

a first dividing module 702, configured to divide an information bit sequence of the UCI to be transmitted in the calculating module 701 into two parts;

a first encoding module 703, configured to use RM (32, O) code to encode each part of the information bit sequence of the UCI to be transmitted, which is divided by the first dividing module 702, to obtain a 32-bit coded bit sequence respectively, and perform rate matching for each 32-bit coded bit sequence to set a first 32-bit coded bit sequence to $\lceil Q'/2 \rceil \times Q_m$ bits coded bit sequence through rate matching and to set a second 32-bit coded bit sequence to $(Q'-\lceil Q'/2 \rceil) \times Q_m$ bits coded bit sequence through rate matching, where $Q_m$ is the modulation order corresponding to the UCI to be transmitted, and $\lceil \ \rceil$ refers to rounding up; and a transmitting module 704, configured to map the two parts of coded bit sequences that are obtained by the first encoding module 703 and have undergone rate matching onto a PUSCH, and transmit the two parts of the coded bit sequences to a base station.

The transmitting module 704 includes at least one of the following transmitting units:

a first transmitting unit, configured to concatenate the two parts of coded bit sequences that are obtained by the first encoding module 703 and have undergone rate matching to form a new bit sequence, map the new bit sequence onto the PUSCH, and transmit the new bit sequence to the base station;

a second transmitting unit, configured to select alternately $4Q_m$ coded bits in one of the two parts of coded bit sequences that are obtained by the first encoding module 703 and have undergone rate matching and $4Q_m$ coded bits in the other part of coded bit sequence to form a new bit sequence, map the new bit sequence onto the PUSCH, and transmit the new bit sequence to the base station; and a third transmitting unit, configured to select alternately $Q_m$ coded bits in one of the two parts of coded bit sequences that are obtained by the first encoding module 703 and have undergone rate matching and $Q_m$ coded bits in the other part of coded bit sequence, and, after $4Q_m$ coded bits are selected, switch the order of selecting alternately the two parts of coded bit sequences that are obtained by the first encoding module 703 and have undergone rate matching, go on selecting the coded bits alternately to form a new bit sequence, map the new bit sequence onto the PUSCH and transmit the new bit sequence to the base station.

The first encoding module 703 includes:

a first encoding unit, configured to use RM (32, O) code to encode each part of information bit sequence of the UCI to be transmitted that is divided by the first dividing module 702 to obtain a 32-bit coded bit sequence respectively;

a first obtaining unit, configured to obtain the bit $O_n$ of the information bit sequence corresponding to the first 32-bit coded bit sequence obtained by the first encoding unit, a basic sequence $M_{j,n}$ of the RM (32, O) code, and O' being the number of bits of the information bit sequence corresponding to the first 32-bit coded bit sequence;

a first rate matching unit, configured to: select the first $\lceil Q'/2 \rceil \times Q_m$ bits in the first 32-bit coded bit sequence obtained by the first encoding unit if the value of $\lceil Q'/2 \rceil \times Q_m$ is less than or equal to 32 bits, or perform rate matching for the first 32-bit coded bit sequence to set the sequence to $\lceil Q'/2 \rceil \times Q_m$ bits coded bit sequence according to $q_i = b_{(i \bmod 32)}$ (i=0,1, ..., ($\lceil Q'/2 \rceil \times Q_m - 1$)) if the value of $\lceil Q'/2 \rceil \times Q_m$ is greater than 32 bits, where $q_i$ is a coded bit sequence output after the first 32-bit coded bit sequence is set to $\lceil Q'/2 \rceil \times Q_m$ bits coded bit sequence through rate matching, $$b_j = \sum_{n=0}^{O'} (O_n \times M_{j,n}) \bmod 2$$

(j=0,1, ... ,31) is the first 32-bit coded bit sequence, and $O_n$, $M_{j,n}$ and O' are parameters obtained by the first obtaining unit; in this case, considering that O' is the number of bits of the information bit sequence corresponding to the first 32-bit coded bit sequence and $O_n$ is the bit in the information bit sequence corresponding to the first 32-bit coded bit sequence, when n starts from 0, no bit like $O_{O'}$ exists in the information bit sequence corresponding to the first 32-bit coded bit sequence, namely, no $O_{O'}$ bit exists, and therefore, the formula $$b_j = \sum_{n=0}^{O'} (O_n \times M_{j,n}) \bmod 2$$

is equivalent to the formula $$b_j = \sum_{n=0}^{O'-1} (O_n \times M_{j,n}) \bmod 2;$$

a second obtaining unit, configured to obtain the bit $O_n$ of the information bit sequence corresponding to the second 32-bit coded bit sequence obtained by the first encoding unit, a basic sequence $M_{j,n}$ of the RM (32, O) code, and O' being the number of bits of the information bit sequence corresponding to the second 32-bit coded bit sequence; and a second rate matching unit, configured to: select the first $(Q'-\lceil Q'/2\rceil)\times Q_m$ bits in the second 32-bit coded bit sequence obtained by the first encoding unit if the value of $(Q'-\lceil Q'/2\rceil)\times Q_m$ is less than or equal to 32 bits, or perform rate matching for the second 32-bit coded bit sequence to set the sequence to $(Q'-\lceil Q'/2\rceil)\times Q_m$ bits coded bit sequence according to $q_i=b_{(i \bmod 32)}$ (i=0,1, ..., $((Q'-\lceil Q'/2\rceil)\times Q_m-1)$) if the value of $(Q'-\lceil Q'/2\rceil)\times Q_m$ is greater than 32 bits, where $q_i$ is a coded bit sequence output after the second 32-bit coded bit sequence is set to $(Q'-\lceil Q'/2\rceil)\times Q_m$ bits coded bit sequence through rate matching, $$b_j = \sum_{n=0}^{O'} (O_n \times M_{j,n}) \bmod 2$$

(j=0,1, ..., 31) is the second 32-bit coded bit sequence, and $O_n$, $M_{j,n}$ and O' are parameters obtained by the second obtaining unit; in this case, considering that O' is the number of bits of the information bit sequence corresponding to the second 32-bit coded bit sequence and $O_n$ is the bit in the information bit sequence corresponding to the second 32-bit coded bit sequence, when n starts from 0, no bit like $O_{O'}$ exists in the information bit sequence corresponding to the second 32-bit coded bit sequence, namely, no $O_{O'}$ bit exists, and therefore, the formula $$b_j = \sum_{n=0}^{O'} (O_n \times M_{j,n}) \bmod 2$$

is equivalent to the formula $$b_j = \sum_{n=0}^{O'-1} (O_n \times M_{j,n}) \bmod 2.$$

The terminal provided in this embodiment is based on the same conception of the terminals disclosed in Embodiment 2 and Embodiment 3 of the methods above. For the detailed implementation process of the terminal, see Embodiment 2 and Embodiment 3 of the methods above.

In this embodiment, the information bit sequence of the UCI is divided into two parts, and each part is encoded to generate a 32-bit coded bit sequence respectively; rate matching is performed for each 32-bit coded bit sequence respectively and then the coded bit sequence is transmitted, and therefore, the UCI which occupies bits more than the maximum number of bits supported by RM (32, O) code is transmitted properly. Moreover, each part of information bit sequence of the UCI obtains enough coding gain even if $(Q'/2)\times Q_m$ is greater than 24 bits, thereby improving transmission performance of the UCI.

Embodiment 5

Figure 12:
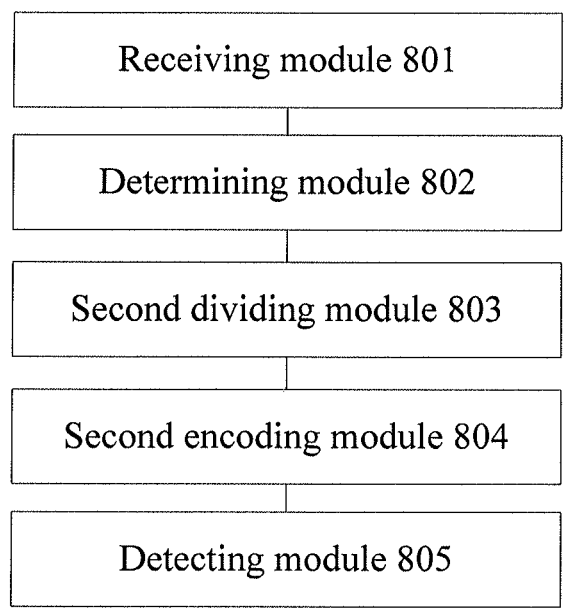
FIG. 12 is a schematic structure diagram of a base station according to Embodiment 5.

As shown in FIG. 12, a base station provided in this embodiment includes:

a receiving module 801, configured to receive UCI sent by a terminal, calculate the number Q' of modulation symbols occupied by the UCI, and obtain modulation order $Q_m$ corresponding to the UCI;

a determining module 802, configured to determine candidate control information bit sequences according to the number of bits of the UCI received by the receiving module 801;

a second dividing module 803, configured to divide each candidate control information bit sequence determined by the determining module 802 into two parts;

a second encoding module 804, configured to use RM (32, O) code to encode each part of each candidate control information bit sequence divided by the second dividing module 803 to obtain a 32-bit coded bit sequence respectively, and perform rate matching for each 32-bit coded bit sequence to set a first 32-bit coded bit sequence to $\lceil Q'/2\rceil \times Q_m$ bits coded bit sequence through rate matching and to set a second 32-bit coded bit sequence to $(Q'-\lceil Q'/2\rceil)\times Q_m$ bits coded bit sequence through rate matching, where $Q_m$ is modulation order corresponding to the UCI, and $\lceil\ \rceil$ refers to rounding up; and a detecting module 805, configured to detect the UCI by using the two parts of coded bit sequences which are obtained by the second encoding module 804, correspond to each candidate control information bit sequence and have undergone rate matching.

The detecting module 805 includes at least one of the following detecting units:

a first detecting unit, configured to concatenate the two parts of coded bit sequences that are obtained by the second encoding module 804 and have undergone rate matching to form a new bit sequence, and use the new bit sequence to detect the UCI;

a second detecting unit, configured to select alternately $4Q_m$ coded bits in one of the two parts of coded bit sequences that that are obtained by the second encoding module 804 and have undergone rate matching and $4Q_m$ coded bits in the other part of coded bit sequence to form a new bit sequence, and use the new bit sequence to detect the UCI; and a third detecting unit, configured to select alternately $Q_m$ coded bits in one of the two parts of coded bit sequences that are obtained by the second encoding module 804 and have undergone rate matching and $Q_m$ coded bits in the other part of coded bit sequence, and, after $4Q_m$ coded bits are selected, switch the order of selecting alternately the two parts of coded bit sequences that have undergone rate matching, go on selecting the coded bits alternately to form a new bit sequence, and use the new bit sequence to detect the UCI.

The second encoding module 804 includes:

a second encoding unit, configured to use RM (32, O) code to encode each part of each candidate control information bit sequence divided by the second dividing module 803 to obtain a 32-bit coded bit sequence respectively;

a third obtaining unit, configured to obtain the bit $O_n$ of the information bit sequence corresponding to the first 32-bit coded bit sequence obtained by the second encoding unit, a basic sequence $M_{j,n}$ of the RM (32, O) code, and O' being the number of bits of the information bit sequence corresponding to the first 32-bit coded bit sequence;

a third rate matching unit, configured to: select the first $\lceil Q'/2\rceil \times Q_m$ bits in the first 32-bit coded bit sequence if the value of $\lceil Q'/2\rceil \times Q_m$ is less than or equal to 32 bits, or perform rate matching for the first 32-bit coded bit sequence to set the sequence to $\lceil Q'/2\rceil \times Q_m$ bits coded bit sequence according to $q_i=b_{(i \bmod 32)}$ (i=0,1, ..., $(\lceil Q'/2\rceil \times Q_m-1)$) if the value of $\lceil Q'/2\rceil \times Q_m$ is greater than 32 bits, where $q_i$ is a coded bit sequence output after the first 32-bit coded bit sequence is set to $\lceil Q'/2 \rceil \times Q_m$ bits coded bit sequence through rate matching, $$b_j = \sum_{n=0}^{O'} (O_n \times M_{j,n}) \bmod 2$$

(j=0,1, ... ,31) is the first 32-bit coded bit sequence, and $O_n$, $M_{j,n}$ and O' are parameters obtained by the third obtaining unit; in this case, considering that O' is the number of bits of the information bit sequence corresponding to the first 32-bit coded bit sequence and $O_n$ is the bit in the information bit sequence corresponding to the first 32-bit coded bit sequence, when n starts from 0, no bit like $O_{O'}$ exists in the information bit sequence corresponding to the first 32-bit coded bit sequence, namely, no $O_{O'}$ bit exists, and therefore, the formula $$b_j = \sum_{n=0}^{O'} (O_n \times M_{j,n}) \bmod 2$$

is equivalent to the formula $$b_j = \sum_{n=0}^{O'-1} (O_n \times M_{j,n}) \bmod 2;$$

a fourth obtaining unit, configured to obtain the bit $O_n$ of the information bit sequence corresponding to the second 32-bit coded bit sequence obtained by the second encoding unit, a basic sequence $M_{j,n}$ of the RM (32, O) code, and O' being the number of bits of the information bit sequence corresponding to the second 32-bit coded bit sequence; and a fourth rate matching unit, configured to: select the first $(Q'-\lceil Q'/2 \rceil) \times Q_m$ bits in the second 32-bit coded bit sequence if the value of $(Q'-\lceil Q'/2 \rceil) \times Q_m$ is less than or equal to 32 bits, or perform rate matching for the second 32-bit coded bit sequence to set the sequence to $(Q'-\lceil Q'/2 \rceil) \times Q_m$ bits coded bit sequence according to $q_i = b_{(i \bmod 32)}$ (i=0,1, ... , $((Q'-\lceil Q'/2 \rceil) \times Q_m - 1))$ if the value of $(Q'-\lceil Q'/2 \rceil) \times Q_m$ is greater than 32 bits, where $q_i$ is a coded bit sequence output after the second 32-bit coded bit sequence is set to $(Q'-\lceil Q'/2 \rceil) \times Q_m$ bits coded bit sequence through rate matching, $$b_j = \sum_{n=0}^{O'} (O_n \times M_{j,n}) \bmod 2$$

(j=0,1, ... ,31) is the second 32-bit coded bit sequence, and $O_n$, $M_{j,n}$ and O' are parameters obtained by the fourth obtaining unit; in this case, considering that O' is the number of bits of the information bit sequence corresponding to the second 32-bit coded bit sequence and $O_n$ is the bit in the information bit sequence corresponding to the second 32-bit coded bit sequence, when n starts from 0, no bit like $O_{O'}$ exists in the information bit sequence corresponding to the second 32-bit coded bit sequence, namely, no $O_{O'}$ bit exists, and therefore, the formula $$b_j = \sum_{n=0}^{O'} (O_n \times M_{j,n}) \bmod 2$$

is equivalent to the formula $$b_j = \sum_{n=0}^{O'-1} (O_n \times M_{j,n}) \bmod 2.$$

The base station provided in this embodiment is based on the same conception of the base stations disclosed in method embodiment 2 and method embodiment 3 above. For the detailed implementation process of the base station, see method embodiment 2 and method embodiment 3 above.

The embodiment provides a base station corresponding to the terminal transmission method. The base station enables the terminal side to transmit UCI according to the transmission method provided in this embodiment, and therefore, the UCI can be transmitted properly even if the number of bits occupied by the UCI exceeds the maximum number of bits supported by RM (32, O) code. Moreover, each part of information bit sequence of the UCI obtains enough coding gain even if $(Q'/2) \times Q_m$ is greater than 24 bits, thereby improving transmission performance of the UCI.

Embodiment 6

Figure 13:
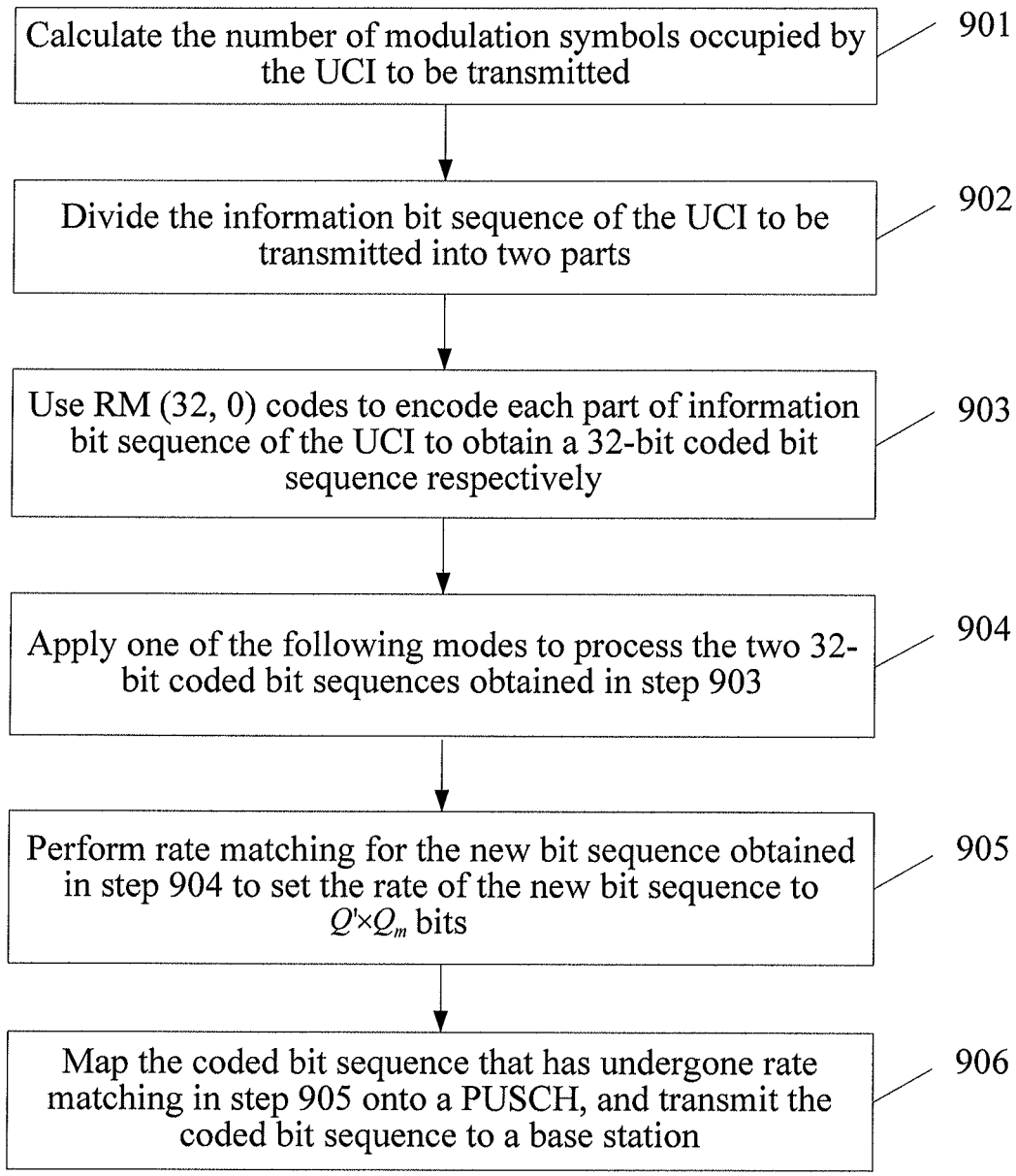
FIG. 13 is a flowchart of a method for transmitting UCI according to Embodiment 6.

As shown in FIG. 13, this embodiment provides a method for transmitting UCI. On the terminal side, the method includes the following steps:

901: Calculate the number Q' of modulation symbols occupied by the UCI to be transmitted.

This step is the same as step 501.

902: Divide the information bit sequence of the UCI to be transmitted into two parts.

This step is the same as step 502.

903: Use RM (32, O) code to encode each part of information bit sequence of the UCI to obtain a 32-bit coded bit sequence respectively.

Specifically, the calculation formula of $b_j$ in Embodiment 3 may be applied in this step. For details, see the third embodiment.

904: Apply one of the following modes to process the two 32-bit coded bit sequences obtained in step 903:

Mode 1: Concatenate the two 32-bit coded bit sequences to form a new bit sequence;

Mode 2: Select alternately $Q_m$ coded bits in one of the 32-bit coded bit sequences and $Q_m$ coded bits in the other 32-bit coded bit sequence to form a new 64-bit coded bit sequence;

Mode 3: Select alternately $4Q_m$ coded bits in one of the 32-bit coded bit sequences and $4Q_m$ coded bits in the other 32-bit coded bit sequence to form a new coded bit sequence; and Mode 4: Select alternately $Q_m$ coded bits in one of the two 32-bit coded bit sequences and $Q_m$ coded bits in the other 32-bit coded bit sequence; after $4Q_m$ coded bits are selected, switch the order of selecting alternately the two 32-bit coded bit sequences, and go on selecting the coded bits alternately to form a new bit sequence.

905: Perform rate matching for the new bit sequence obtained in step 904 to set the new bit sequence to $Q' \times Q_m$ bits coded bit sequence.

$Q_m$ above is the modulation order corresponding to the UCI to be transmitted.

This step may be performed in the following way:

Select the first $Q' \times Q_m$ bits in 64 coded bits if the value of $Q' \times Q_m$ is less than or equal to 64 bits, or perform circular repetition matching for the 64-bit coded bits to set the sequence to $Q' \times Q_m$ bits coded bit sequence if the value of $Q' \times Q_m$ is greater than 64 bits. Specifically, the rate matching may be performed according to formula (3). For example, if the value of $Q' \times Q_m$ is 96, append the first 32 bits in the 64 bits to the 64 bits to form 96 bits. The formula is:

$$q'_i = b'_{(i \bmod 64)}, i=0,1, \ldots, Q' \cdot Q_m - 1 \tag{3}$$

In the formula above, $q'_i$ is a coded bit sequence output after rate matching, j=i mod 64, and $b'_j$ is the 64-bit coded bit sequence obtained in step 904.

906: Map the coded bit sequence that has undergone rate matching in step 905 onto a PUSCH, and transmit the coded bit sequence to a base station.

In the transmission method provided in this embodiment, the information bit sequence of the UCI is divided into two parts, and each part is encoded by using RM (32, O) code to obtain a 32-bit coded bit sequence respectively; and one of the modes specified in step 904 is applied to select alternately coded bits in one of the two 32-bit coded bit sequences and coded bits in the other 32-bit coded bit sequence to obtain a 64-bit coded bit sequence; and rate matching is performed for the 64-bit coded bit sequence to set the sequence to $Q'\times Q_m$ bits coded bit sequence, and then the sequence is transmitted. In this way, the UCI is transmitted properly even if the number of bits occupied by the UCI exceeds the maximum number of bits supported by the RM (32, O) code.

Figure 14:
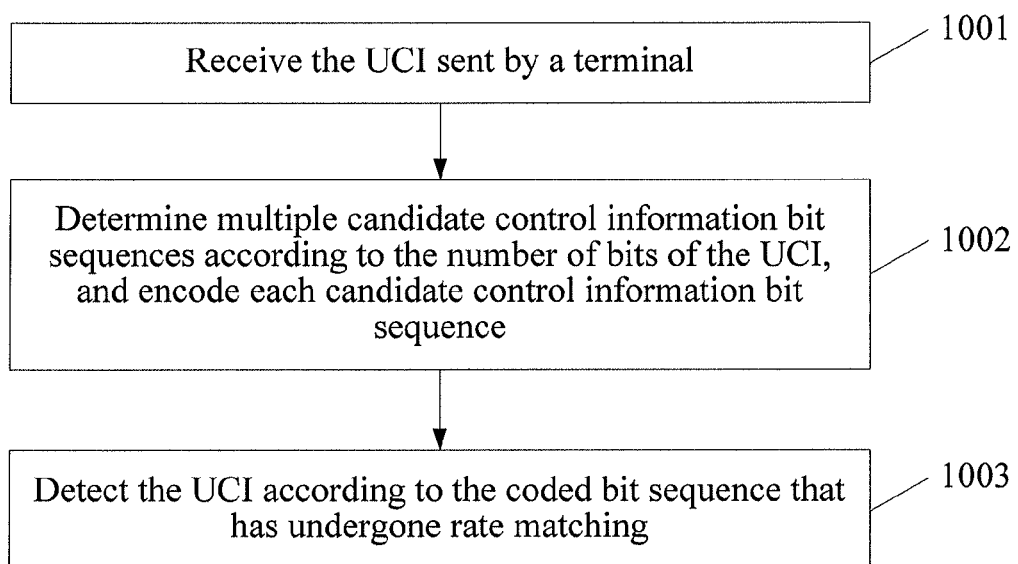
FIG. 14 is a flowchart of a method for receiving UCI according to Embodiment 6.

As shown in FIG. 14, this embodiment provides a method for receiving UCI. On the base station side, the method includes the following steps:

1001: Receive UCI sent by a terminal.

This step includes the following two steps:

1001a: Calculate the number $Q'$ of modulation symbols occupied by the UCI sent by the terminal.

This step is the same as step 901.

1001b: Separate the UCI transmitted together with the data according to $Q'$.

In this step, the base station separates the UCI transmitted together with the data, and specifically, separates the modulation symbols corresponding to the UCI transmitted together with the data, according to the number of modulation symbols occupied by the UCI in step 1,001a, or further according to the step of channel de-interleaving.

1002: Determine multiple candidate control information bit sequences according to the number of bits of the UCI, and encode each candidate control information bit sequence.

Specifically, find all the bit sequences which include bits with the number equivalent to the number of bits of the UCI to be detected, and use the bit sequences as candidate control information bit sequences. For example, when the number of bits of UCI transmitted together with the data is 12, there are $2^{12}$ candidate control information bit sequences.

The base station encodes each candidate control information bit sequence respectively, and the encoding includes the following steps:

1002a: Divide each candidate control information bit sequence into two parts.

1002b. Use RM (32, O) code to encode each part of the candidate control information bit sequence to obtain a 32-bit coded bit sequence respectively.

1002c: Apply one of the following modes to process the two 32-bit coded bit sequences obtained in step 1002b:

Mode 1: Concatenate the two 32-bit coded bit sequences to form a new bit sequence;

Mode 2: Select alternately $Q_m$ coded bits in one of the 32-bit coded bit sequences and $Q_m$ coded bits in the other 32-bit coded bit sequence to form a new 64-bit coded bit sequence;

Mode 3: Select alternately $4Q_m$ coded bits in one of the 32-bit coded bit sequences and $4Q_m$ coded bits in the other 32-bit coded bit sequence to form a new coded bit sequence; and Mode 4: Select alternately $Q_m$ cod d bits in one of the two 32-bit coded bit sequences and $Q_m$ cod d bits in the other 32-bit coded bit sequence; after $4Q_m$ coded bits are selected, switch the order of selecting alternately the two 32-bit coded bit sequences, and go on selecting the coded bits alternately to form a new bit sequence.

1002d: Perform rate matching for the bit sequence obtained in step 1002c to set the sequence to $Q'\times Q_m$ bits coded bit sequence.

This step is the same as step 905.

1003: Detect the UCI according to the coded bit sequence that has undergone rate matching.

The detection criteria in this step come in many types such as maximum likelihood, and are not limited herein.

The receiving method provided in this embodiment corresponds to the transmitting method provided in this embodiment. Through this receiving method, the terminal side can transmit UCI according to the transmission method provided in this embodiment, and therefore, the UCI can be transmitted properly even if the number of bits occupied by the UCI exceeds the maximum number of bits supported by RM (32, O) code.

All or part of the contents in the technical solution provided in the foregoing embodiments may be implemented through software programming, and the software program is stored in readable storage media such as a computer hard disk, floppy disk, or optical disk.

The above descriptions are merely exemplary embodiments, but are not intended to limit the scope of the claims. Modifications, variations or replacement that can be easily derived based on these embodiments are understood to fall within the protection scope of the claims.

What is claimed is:

1. A method for transmitting Uplink Control Information, comprising:
    calculating $Q'$ for modulation symbols occupied by the Uplink Control Information (UCI) to be transmitted;
    dividing an information bit sequence of the UCI to be transmitted into two parts;
    using a Reed Muller RM (32, O) code to encode each part of the information bit sequence of the UCI to be transmitted to obtain a 32-bit coded bit sequence, respectively,
    performing rate matching for each 32-bit coded bit sequence, respectively, to set a first 32-bit coded bit sequence to $\lceil Q'/2 \rceil \times Q_m$ bits coded bit sequence through rate matching and to set a second 32-bit coded bit sequence to $(Q'-\lceil Q'/2 \rceil)\times Q_m$ bits coded bit sequence through rate matching, wherein $Q_m$ is a modulation order corresponding to the UCI to be transmitted, and $\lceil\ \rceil$ refers to rounding up;
    mapping the two parts of coded bit sequences that have undergone rate matching onto a Physical Uplink Shared Channel (PUSCH); and
    transmitting the two parts of the coded bit sequences to a base station.

2. The method according to claim 1, wherein
    mapping of the two parts of coded bit sequences that have undergone rate matching onto the PUSCH and transmitting of the two parts of the coded bit sequences to the base station comprise:
    concatenating the two parts of coded bit sequences that have undergone rate matching to form a new bit sequence;
    mapping the new bit sequence onto the PUSCH; and
    transmitting the new bit sequence to the base station.

3. The method according to claim 1, wherein
    mapping of the two parts of coded bit sequences that have undergone rate matching onto the PUSCH and transmitting of the two parts of the coded bit sequences to the base station comprise:
    selecting 4 $Q_m$ coded bits in one of the two parts of coded bit sequences that have undergone rate matching and 4

$Q_m$ coded bits in another part of coded bit sequences that have undergone rate matching to form a new bit sequence, mapping the new bit sequence onto the PUSCH, and transmitting the new bit sequence to the base station.

4. The method according to claim 1, wherein
mapping of the two parts of coded bit sequences that have undergone rate matching onto the PUSCH and transmitting of the two parts of the coded bit sequences to the base station comprise:
selecting $Q_m$ coded bits in one of the two parts of the coded bit sequences that have undergone rate matching and $Q_m$ coded bits in another part of the coded bit sequences that have undergone rate matching; after 4 $Q_m$ coded bits are selected, switching order of selecting alternately the two parts of coded bit sequences that have undergone rate matching, going on selecting the coded bits alternately to form a new bit sequence, mapping the new bit sequence onto the PUSCH, and transmitting the new bit sequence to the base station.

5. The method according to claim 1, wherein
setting of the first 32-bit coded bit sequence to $\lceil Q'/2 \rceil \times Q_m$ bits coded bit sequence through rate matching comprises:
if a value of $\lceil Q'/2 \rceil \times Q_m$ is less than or equal to 32, selecting a first $\lceil Q'/2 \rceil \times Q_m$ bits in the first 32-bit coded bit sequence;
if the value of $\lceil Q'/2 \rceil \times Q_m$ is greater than 32, according to $q_i = b_{(i \bmod 32)}$ (i=0,1, ..., ($\lceil Q'/2 \rceil \times Q_m - 1$)), performing rate matching to set the first 32-bit coded bit sequence to a $\lceil Q'/2 \rceil \times Q_m$ bits coded bit sequence, wherein $q_i$ is a coded bit sequence output after the first 32-bit coded bit sequence is set to the $\lceil Q'/2 \rceil \times Q_m$ bits coded bit sequence through rate matching, $$b_j = \sum_{n=0}^{O'-1} (O_n \times M_{j,n}) \bmod 2$$

(j=0,1,...,31) is the first 32-bit coded bit sequence, $O_n$ is a bit in the information bit sequence corresponding to the first 32-bit coded bit sequence, $M_{j,n}$ is a basic sequence of RM (32, O) code, and O' is a number of bits of the information bit sequence corresponding to the first 32-bit coded bit sequence.

6. The method according to claim 1, wherein
setting of the second 32-bit coded bit sequence to the $(Q' - \lceil Q'/2 \rceil) \times Q_m$ bits coded bit sequence through rate matching comprises:
if a value of $(Q' - \lceil Q'/2 \rceil) \times Q_m$ is less than or equal to 32, selecting first $(Q' - \lceil Q'/2 \rceil) \times Q_m$ bits in the second 32-bit coded bit sequence;
if the value of $(Q' - \lceil Q'/2 \rceil) \times Q_m$ is greater than 32, according to $q_i = b_{(i \bmod 32)}$ (i=0,1, ..., $((Q' - \lceil Q'/2 \rceil) \times Q_m - 1)$), performing rate matching to set the second 32-bit coded bit sequence to a $(Q' - \lceil Q'/2 \rceil) \times Q_m$ bits coded bit sequence, wherein $q_i$ is a coded bit sequence output after the second 32-bit coded bit sequence is set to the $(Q' - \lceil Q'/2 \rceil) \times Q_m$ bits coded bit sequence through rate matching, $$b_j = \sum_{n=0}^{O'-1} (O_n \times M_{j,n}) \bmod 2$$

(j=0,1,...,31) is the second 32-bit coded bit sequence, $O_n$ is a bit in the information bit sequence corresponding to the second 32-bit coded bit sequence, $M_{j,n}$ is a basic sequence of RM (32, O) code, and O' is a number of bits of the information bit sequence corresponding to the second 32-bit coded bit sequence.

7. The method according to claim 1, wherein
performance of rate matching for each 32-bit coded bit sequence respectively comprises:
performing rate matching for each 32-bit coded bit sequence respectively by circular repetition.

8. A method for receiving Uplink Control Information, comprising:
receiving the Uplink Control Information from a terminal;
calculating Q' of modulation symbols occupied by the Uplink Control Information;
determining candidate control information bit sequences according to a number of bits of the Uplink Control Information;
dividing each candidate control information bit sequence into two parts;
using a Reed Muller RM (32, O) code to encode each part of each candidate control information bit sequence to obtain a 32-bit coded bit sequence, respectively,
performing rate matching for each 32-bit coded bit sequence to set a first 32-bit coded bit sequence to $\lceil Q'/2 \rceil \times Q_m$ bits coded bit sequence through rate matching and to set a second 32-bit coded bit sequence to $(Q' - \lceil Q'/2 \rceil) \times Q_m$ bits coded bit sequence through rate matching, wherein $Q_m$ is modulation order corresponding to the Uplink Control Information, and $\lceil \ \rceil$ refers to rounding up; and
detecting the Uplink Control Information by using the two parts of coded bit sequences which correspond to each candidate control information bit sequence and have undergone rate matching.

9. The method according to claim 8, wherein detection of the Uplink Control Information by using the two parts of coded bit sequences which correspond to each candidate control information bit sequence and have undergone rate matching comprises:
concatenating the two parts of coded bit sequences that have undergone rate matching to form a new bit sequence, and using the new bit sequence to detect the Uplink Control Information.

10. The method according to claim 8, wherein detection of the Uplink Control Information by using the two parts of coded bit sequences which correspond to each candidate control information bit sequence and have undergone rate matching comprises:
selecting alternately $4Q_m$ coded bits in one of the two parts of coded bit sequences that have undergone rate matching and $4Q_m$ coded bits in another part of coded bit sequences that have undergone rate matching to form a new bit sequence, and using the new bit sequence to detect the UCI.

11. The method according to claim 8, wherein detection of the Uplink Control Information by using the two parts of coded bit sequences which correspond to each candidate control information bit sequence and have undergone rate matching comprises:
selecting alternately $Q_m$ coded bits in one of the two parts of the coded bit sequences that have undergone rate matching and $Q_m$ coded bits in another part of coded bit sequences that have undergone rate matching; after $4Q_m$ coded bits are selected, switching order of selecting alternately the two parts of coded bit sequences that have undergone rate matching, going on selecting the coded bits alternately to form a new bit sequence, and using the new bit sequence to detect the Uplink Control Information.

12. The method according to claim 8, wherein setting of the first 32-bit coded bit sequence to the $\lceil Q'/2 \rceil \times Q_m$ bits coded bit sequence through rate matching comprises:
if a value of $\lceil Q'/2 \rceil \times Q_m$ is less than or equal to 32, selecting a first $\lceil Q'/2 \rceil \times Q_m$ bits in the first 32-bit coded bit sequence; and
if the value of $\lceil Q'/2 \rceil \times Q_m$ is greater than 32, according to $q_i = b_{(i \bmod 32)}$ (i=0,1, ..., ($\lceil Q'/2 \rceil \times Q_m - 1$)), performing rate matching to set the first 32-bit coded bit sequence to a $\lceil Q'/2 \rceil \times Q_m$ bits coded bit sequence, wherein $q_i$ is a coded bit sequence output after the first 32-bit coded bit sequence is set to the $\lceil Q'/2 \rceil \times Q_m$ bits coded bit sequence through rate matching, $$b_j = \sum_{n=0}^{O'-1} (O_n \times M_{j,n}) \bmod 2$$

(j=0,1,...,31) is the first 32-bit coded bit sequence, $O_n$ is a bit in the information bit sequence corresponding to the first 32-bit coded bit sequence, $M_{j,n}$ is a basic sequence of RM (32, O) code, and O' is a number of bits of the information bit sequence corresponding to the first 32-bit coded bit sequence.

13. The method according to claim 8, wherein setting of the second 32-bit coded bit sequence to the $(Q' - \lceil Q'/2 \rceil) \times Q_m$ bits coded bit sequence through rate matching comprises:
if a value of $(Q' - \lceil Q'/2 \rceil) \times Q_m$ is less than or equal to 32, selecting first $(Q' - \lceil Q'/2 \rceil) \times Q_m$ bits in the second 32-bit coded bit sequence; and
if the value of $(Q' - \lceil Q'/2 \rceil) \times Q_m$ is greater than 32, according to $q_i = b_{(i \bmod 32)}$ (i=0,1, ..., (($Q' - \lceil Q'/2 \rceil) \times Q_m - 1$)), performing rate matching to set the second 32-bit coded bit sequence to a $(Q' - \lceil Q'/2 \rceil) \times Q_m$ bits coded bit sequence, wherein $q_i$ is a coded bit sequence output after the second 32-bit coded bit sequence is set to the $(Q' - \lceil Q'/2 \rceil) \times Q_m$ bits coded bit sequence through rate matching, $$b_j = \sum_{n=0}^{O'-1} (O_n \times M_{j,n}) \bmod 2$$

(j=0,1,...,31) is the second 32-bit coded bit sequence, $O_n$ is a bit in the information bit sequence corresponding to the second 32-bit coded bit sequence, $M_{j,n}$ is a basic sequence of RM (32, O) code, and O' is the number of bits of the information bit sequence corresponding to the second 32-bit coded bit sequence.

14. A terminal, comprising:
a calculating module configured to calculate Q' of modulation symbols occupied by Uplink Control Information (UCI) to be transmitted, and obtain a modulation order $Q_m$ corresponding to the UCI to be transmitted;
a first dividing module configured to divide an information bit sequence of the UCI to be transmitted in the calculating module into two parts;
a first encoding module configured to use a Reed Muller (RM) (32, O) code to encode each part of the information bit sequence of the UCI to be transmitted to obtain a 32-bit coded bit sequence respectively, and perform rate matching for each 32-bit coded bit sequence to set a first 32-bit coded bit sequence to $\lceil Q'/2 \rceil \times Q_m$ bits coded bit sequence through rate matching and to set a second 32-bit coded bit sequence to $(Q' - \lceil Q'/2 \rceil) \times Q_m$ bits coded bit sequence through rate matching, wherein $Q_m$ is the modulation order corresponding to the UCI to be transmitted, and $\lceil \ \rceil$ refers to rounding up; and
a transmitting module, configured to map the two parts of coded bit sequences that have undergone rate matching onto a Physical Uplink Shared Channel (PUSCH), and transmit the two parts of the coded bit sequences to a base station.

15. The terminal according to claim 14, wherein
the transmitting module comprises at least one of the following transmitting units:
a first transmitting unit configured to concatenate the two parts of coded bit sequences that have undergone rate matching to form a new bit sequence, map the new bit sequence onto the PUSCH, and transmit the new bit sequence to the base station;
a second transmitting unit configured to select $4Q_m$ coded bits in one of the two parts of coded bit sequences that have undergone rate matching and $4Q_m$ coded bits in another part of coded bit sequences that have undergone rate matching to form the new bit sequence, map the new bit sequence onto the PUSCH, and transmit the new bit sequence to the base station; and
a third transmitting unit configured to select $Q_m$ coded bits in one of the two parts of coded bit sequences that have undergone rate matching and $Q_m$ coded bits in the other part of coded bit sequences that have undergone rate matching, and, after $4Q_m$ coded bits are selected, switch an order of selecting alternately the two parts of coded bit sequences that have undergone rate matching, go on selecting the coded bits alternately to form the new bit sequence, map the new bit sequence onto the PUSCH and transmit it to the base station.

16. The terminal according to claim 14, wherein the first encoding module comprises:
a first encoding unit configured to use a Reed Muller (RM) (32, O) code to encode each part of information bit sequence of the UCI to be transmitted, which is divided by the first dividing module, to obtain a 32-bit coded bit sequence respectively;
a first obtaining unit configured to obtain a bit $O_n$ of the information bit sequence corresponding to the first 32-bit coded bit sequence obtained by the first encoding unit, a basic sequence $M_{j,n}$ of the RM (32, O) code, and O' being the number of bits of the information bit sequence corresponding to the first 32-bit coded bit sequence;
a first rate matching unit configured to: select first $\lceil Q'/2 \rceil \times Q_m$ bits in the first 32-bit coded bit sequence obtained by the first encoding unit if the value of $\lceil Q'/2 \rceil \times Q_m$ is less than or equal to 32, or perform rate matching for the first 32-bit coded bit sequence to set the sequence to a $\lceil Q'/2 \rceil \times Q_m$ bits coded bit sequence according to $q_i = b_{(i \bmod 32)}$ (i=0,1, ..., ($\lceil Q'/2 \rceil \times Q_m - 1$)) if the value of $\lceil Q'/2 \rceil \times Q_m$ is greater than 32, wherein $q_i$ is a coded bit sequence output after the first 32-bit coded bit sequence is set to the $\lceil Q'/2 \rceil \times Q_m$ bits coded bit sequence through rate matching, $$b_j = \sum_{n=0}^{O'-1} (O_n \times M_{j,n}) \bmod 2$$

(j=0,1,...,31) is the first 32-bit coded bit sequence, and $O_n$, $M_{j,n}$ and O' are parameters obtained by the first obtaining unit;
a second obtaining unit configured to obtain the bit $O_n$ of the information bit sequence corresponding to the second 32-bit coded bit sequence obtained by the first encoding unit, a basic sequence $M_{j,n}$ of the RM (32, O) code, and O' being a number of bits of the information bit sequence corresponding to the second 32-bit coded bit sequence; and a second rate matching unit configured to: select first $(Q'-\lceil Q'/2 \rceil) \times Q_m$ bits in the second 32-bit coded bit sequence obtained by the first encoding unit if the value of $(Q'-\lceil Q'/2 \rceil) \times Q_m$ is less than or equal to 32, or perform rate matching for the second 32-bit coded bit sequence to set the sequence to $(Q'-\lceil Q'/2 \rceil) \times Q_m$ bits coded bit sequence according to $q_i = b_{(i \bmod 32)}$ (i=0,1, ..., $((Q'-\lceil Q'/2 \rceil) \times Q_m - 1)$) if the value of $(Q'-\lceil Q'/2 \rceil) \times Q_m$ is greater than 32, wherein $q_i$ is a coded bit sequence output after the second 32-bit coded bit sequence is set to $(Q'-\lceil Q'/2 \rceil) \times Q_m$ bits coded bit sequence through rate matching, $$b_j = \sum_{n=0}^{O'-1} (O_n \times M_{j,n}) \bmod 2$$

(j=0,1, ..., 31) is the second 32-bit coded bit sequence, and $O_n$, $M_{j,n}$, and O' are parameters obtained by the second obtaining unit.

17. A base station, comprising:
a receiving module configured to receive Uplink Control Information sent by a terminal, calculate a number Q' of modulation symbols occupied by the Uplink Control Information, and obtain modulation order $Q_m$ corresponding to the Uplink Control Information;

a determining module configured to determine candidate control information bit sequences according to the number of bits of the Uplink Control Information received by the receiving module;

a second dividing module, configured to divide each candidate control information bit sequence determined by the determining module into two parts;

a second encoding module configured to use a Reed Muller (RM) (32, O) code to encode each part of each candidate control information bit sequence to obtain a 32-bit coded bit sequence respectively, and perform rate matching for each 32-bit coded bit sequence to set a first 32-bit coded bit sequence to $\lceil Q'/2 \rceil \times Q_m$ bits coded bit sequence through rate matching and to set a second 32-bit coded bit sequence to $(Q'-\lceil Q'/2 \rceil) \times Q_m$ bits coded bit sequence through rate matching, wherein $Q_m$ is modulation order corresponding to the Uplink Control Information, and $\lceil \ \rceil$ refers to rounding up; and a detecting module configured to detect the Uplink Control Information by using the two parts of coded bit sequences which correspond to each candidate control information bit sequence and have undergone rate matching.

18. The base station according to claim 17, wherein the detecting module comprises at least one of the following detecting units:

a first detecting unit configured to concatenate the two parts of coded bit sequences that have undergone rate matching to form a new bit sequence, and use the new bit sequence to detect the Uplink Control Information;

a second detecting unit configured to select $4Q_m$ coded bits in one of the two parts of coded bit sequences that have undergone rate matching and $4Q_m$ coded bits in the other part of coded bit sequences that have undergone rate matching to form the new bit sequence, and use the new bit sequence to detect the Uplink Control Information; and a third detecting unit configured to select $Q_m$ coded bits in one of the two parts of coded bit sequences that have undergone rate matching and $Q_m$ coded bits in the other part of coded bit sequences that have undergone rate matching, and, after $4Q_m$ coded bits are selected, switch the order of selecting alternately the two parts of coded bit sequences that have undergone rate matching, go on selecting the coded bits alternately to form the new bit sequence, and use the new bit sequence to detect the Uplink Control Information.

19. The base station according to claim 17, wherein the second encoding module comprises:

a second encoding unit configured to use a Reed Muller (RM) (32, O) code to encode each part of each candidate control information bit sequence to obtain a 32-bit coded bit sequence, respectively;

a third obtaining unit configured to obtain a bit $O_n$ of the information bit sequence corresponding to the first 32-bit coded bit sequence obtained by the second encoding unit, a basic sequence $M_{j,n}$ of the RM (32, O) code, and O' being a number of bits of the information bit sequence corresponding to the first 32-bit coded bit sequence;

a third rate matching unit configured to: select first $\lceil Q'/2 \rceil \times Q_m$ bits in the first 32-bit coded bit sequence if the value of $\lceil Q'/2 \rceil \times Q_m$ is less than or equal to 32, or perform rate matching for the first 32-bit coded bit sequence to set the sequence to a $\lceil Q'/2 \rceil \times Q_m$ bits coded bit sequence according to $q_i = b_{(i \bmod 32)}$ (i=0,1, ..., $(\lceil Q'/2 \rceil \times Q_m - 1)$) if the value of $\lceil Q'/2 \rceil \times Q_m$ is greater than 32, wherein $q_i$ is a coded bit sequence output after the first 32-bit coded bit sequence is set to the $\lceil Q'/2 \rceil \times Q_m$ bits coded bit sequence through rate matching, $$b_j = \sum_{n=0}^{O'-1} (O_n \times M_{j,n}) \bmod 2$$

(j=0,1, ..., 31) is the first 32-bit coded bit sequence, and $O_n$, $M_{j,n}$ and O' are parameters obtained by the third obtaining unit;

a fourth obtaining unit configured to obtain a bit $O_n$ of the information bit sequence corresponding to the second 32-bit coded bit sequence obtained by the second encoding unit, a basic sequence $M_{j,n}$ of the RM (32, O) code, and O' being a number of bits of the information bit sequence corresponding to the second 32-bit coded bit sequence; and a fourth rate matching unit, configured to: select first $(Q'-\lceil Q'/2 \rceil) \times Q_m$ bits in the second 32-bit coded bit sequence if the value of $(Q'-\lceil Q'/2 \rceil) \times Q_m$ is less than or equal to 32, or perform rate matching for the second 32-bit coded bit sequence to set the sequence to a $(Q'-\lceil Q'/2 \rceil) \times Q_m$ bits coded bit sequence according to $q_i = b_{(i \bmod 32)}$ (i=0, 1, ..., $((Q'-\lceil Q'/2 \rceil) \times Q_m - 1)$) if the value of $(Q'-\lceil Q'/2 \rceil) \times Q_m$ is greater than 32, wherein $q_i$ is a coded bit sequence output after the second 32-bit coded bit sequence is set to the $(Q'-\lceil Q'/2 \rceil) \times Q_m$ bits coded bit sequence through rate matching, $$b_j = \sum_{n=0}^{O'-1} (O_n \times M_{j,n}) \bmod 2$$

(j=0,1, ..., 31) is the second 32-bit coded bit sequence, and $O_n$, $M_{j,n}$ and O' are parameters obtained by the fourth obtaining unit.

* * * * *